(12) United States Patent
Kim et al.

(10) Patent No.: US 10,018,774 B2
(45) Date of Patent: Jul. 10, 2018

(54) BACKLIGHT UNIT, DISPLAY DEVICE, AND METHOD OF MANUFACTURING THE DISPLAY DEVICE

(71) Applicant: Samsung Display Co., Ltd., Yongin-Si, Gyeonggi-Do (KR)

(72) Inventors: Youngsu Kim, Gunpo-si (KR); Sehee Jeon, Seoul (KR); Cheuljin Park, Seoul (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 15/340,386

(22) Filed: Nov. 1, 2016

(65) Prior Publication Data

US 2017/0205571 A1 Jul. 20, 2017

(30) Foreign Application Priority Data

Jan. 15, 2016 (KR) .................. 10-2016-0005524

(51) Int. Cl.
| F21V 7/04 | (2006.01) |
| F21V 7/10 | (2006.01) |
| F21V 15/00 | (2015.01) |
| F21V 8/00 | (2006.01) |
| G02F 1/1333 | (2006.01) |
| G02F 1/1335 | (2006.01) |

(52) U.S. Cl.
CPC .......... *G02B 6/0088* (2013.01); *G02B 6/009* (2013.01); *G02F 1/133308* (2013.01); *G02F 1/133615* (2013.01); *G02F 2001/13332* (2013.01); *G02F 2001/133314* (2013.01); *G02F 2001/133317* (2013.01); *G02F 2001/133325* (2013.01); *G02F 2201/46* (2013.01)

(58) Field of Classification Search
CPC . G02B 6/0088; G02B 6/009; G02F 1/133308; G02F 2001/13332; G02F 2001/133325; G02F 2201/46; G02F 2001/133317; G02F 2001/133314
See application file for complete search history.

(56) References Cited

U.S. PATENT DOCUMENTS

| 2009/0015747 A1* | 1/2009 | Nishizawa | G02F 1/133308 349/58 |
| 2012/0249406 A1* | 10/2012 | Tanaka | G09G 3/36 345/102 |
| 2013/0222736 A1* | 8/2013 | Qi | G06F 1/1601 349/65 |

(Continued)

FOREIGN PATENT DOCUMENTS

| KR | 100951598 B1 | 3/2010 |
| KR | 100990859 B1 | 10/2010 |

(Continued)

*Primary Examiner* — Donald Raleigh
(74) *Attorney, Agent, or Firm* — Cantor Colburn LLP

(57) ABSTRACT

A display device includes a curved display panel, a light source unit, a curved light guide plate, a support frame disposed under the light guide plate and including a curved upper surface, a first magnetic member disposed at at least one edge of the upper surface of the support frame, and a second magnetic member disposed at at least one edge of a surface facing the upper surface of the light guide plate and facing the first magnetic member.

21 Claims, 19 Drawing Sheets

(56) References Cited

U.S. PATENT DOCUMENTS

| | | | |
|---|---|---|---|
| 2014/0118911 A1* | 5/2014 | Tang | G02F 1/133308 361/679.01 |
| 2015/0219324 A1* | 8/2015 | Kim | G02F 1/133305 349/58 |
| 2015/0219940 A1* | 8/2015 | Kim | G02F 1/1336 362/612 |

FOREIGN PATENT DOCUMENTS

| | | |
|---|---|---|
| KR | 1020130037033 A | 4/2013 |
| KR | 1020140043968 A | 4/2014 |
| KR | 1020140086712 A | 7/2014 |

\* cited by examiner

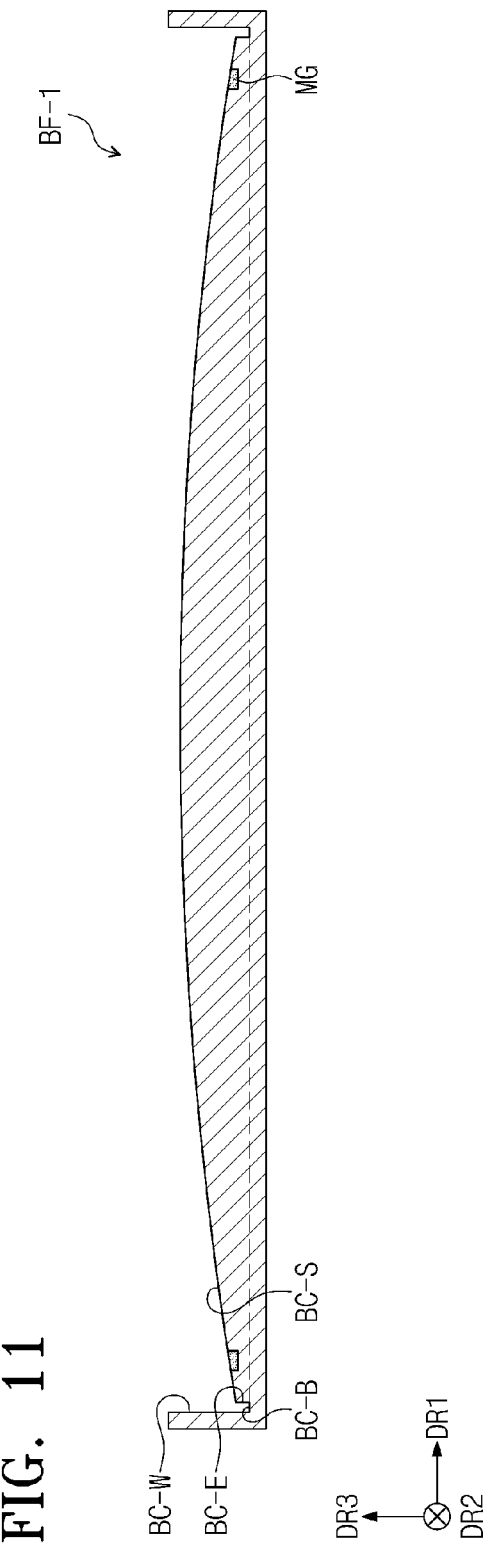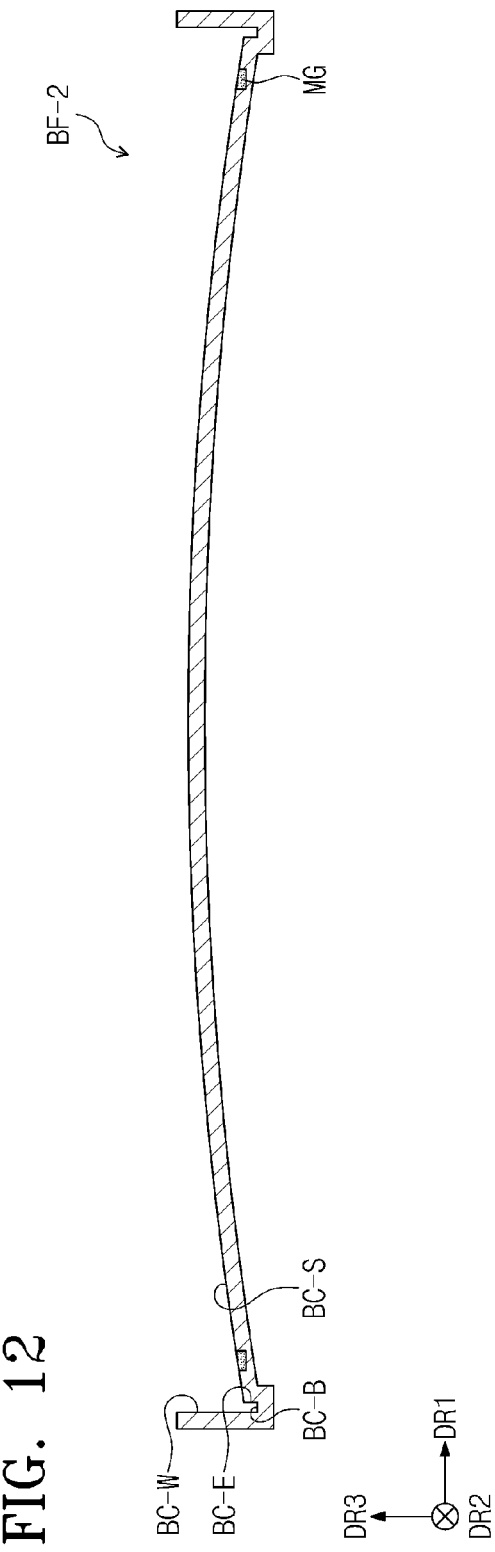

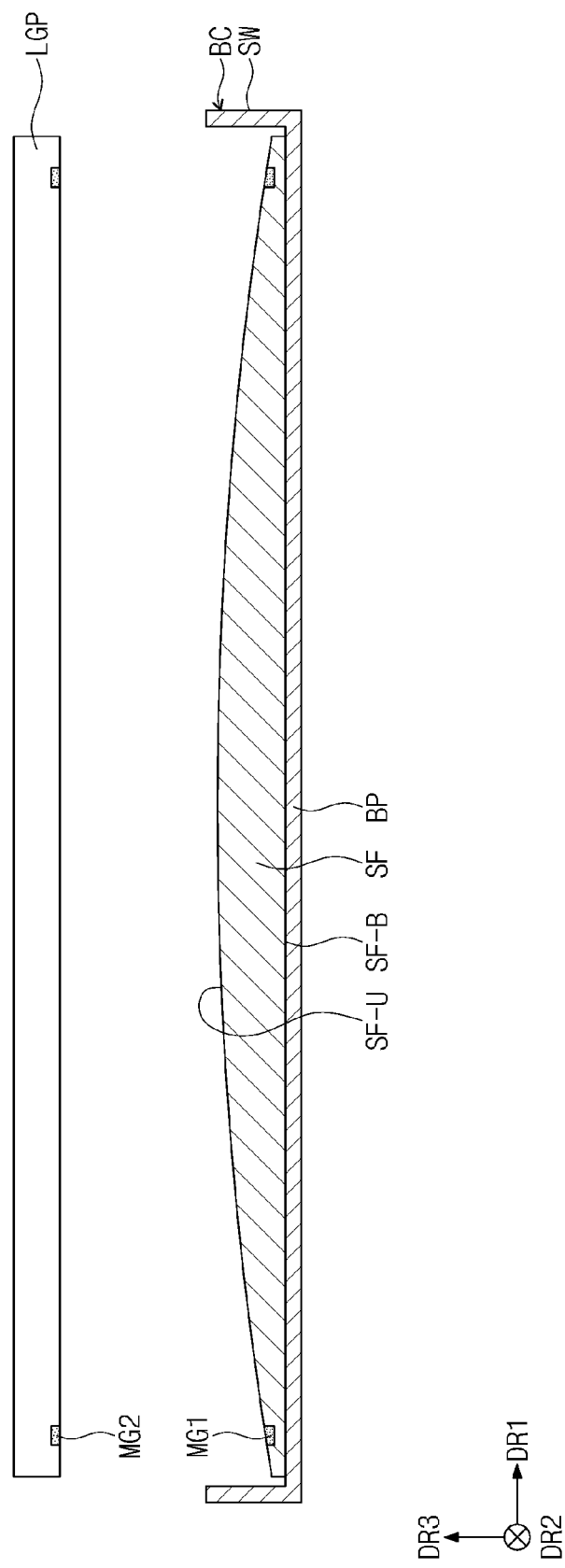

BACKLIGHT UNIT, DISPLAY DEVICE, AND METHOD OF MANUFACTURING THE DISPLAY DEVICE

This application claims priority to Korean Patent Application No. 10-2016-0005524, filed on Jan. 15, 2016, and all the benefits accruing therefrom under 35 U.S.C. § 119, the content of which in its entirety is herein incorporated by reference.

BACKGROUND

1. Field

Exemplary embodiments of the invention relate to a backlight unit, a display device, and a method of manufacturing the display device. More particularly, exemplary embodiments of the invention relate to an improved display device.

2. Description of the Related Art

A flat-panel display device, such as a liquid crystal display device, an organic electroluminescent light emitting display device, etc., is applied to various information processing devices, e.g., a television set, a monitor, a notebook, a mobile phone, etc., to display an image.

In recent years, a curved display device has been also developed with the flat-panel display device. The curved display device provides a curved display area, and thus provides a user with an image having an improved three-dimensional effect, a sense of immersion, and a presence of the image.

SUMMARY

Exemplary embodiments of the invention provide a backlight unit which is easily assembled.

Exemplary embodiments of the invention provide a display device including the backlight unit.

Exemplary embodiments of the invention provide a method of manufacturing the display device.

Exemplary embodiments of the invention provide a display device including a display panel which displays an image and curved with respect to a first direction, a light source unit which provides a light to the display panel, a light guide plate curved with respect to the first direction and including a light incident surface facing the light source unit, a light output surface facing the display panel, and an opposite surface facing the light output surface, a bottom chassis disposed under the light guide plate, a support frame disposed between the light guide plate and the bottom chassis and including an upper surface curved with respect to the first direction and a lower surface which is flat, a first magnetic member disposed at at least one edge of the upper surface of the support frame, and a second magnetic member disposed at at least one edge of the opposite surface of the light guide plate and facing the first magnetic member.

In an exemplary embodiment, each of the display panel, the light guide plate, and the upper surface may be convexly curved on a plane defined by a first direction and a second direction crossing the first direction with respect to a reference axis substantially parallel to the second direction.

In an exemplary embodiment, the bottom chassis may include a bottom portion substantially parallel to the plane defined by the first and second directions and facing the lower surface of the support frame and a sidewall portion bent and extending from the bottom portion.

In an exemplary embodiment, the first magnetic member may be placed in a first groove defined in the upper surface of the support frame. The second magnetic member is placed in a second groove defined in the opposite surface of the light guide plate.

In an exemplary embodiment, the first magnetic member may be provided in a plural number, and the first magnetic members are arranged in one line and spaced apart from each other at regular intervals. The second magnetic member is provided in a plural number, the second magnetic members are arranged in one line and spaced apart from each other at regular intervals, and each of the second magnetic members faces a corresponding first magnetic member of the first magnetic members.

In an exemplary embodiment, the first magnetic member may extend along the one edge of the upper surface of the support frame.

In an exemplary embodiment, the light source unit may include a printed circuit board extending in the second direction and light sources arranged on the printed circuit board along the second direction and spaced apart from each other at regular intervals. The second magnetic member may correspond to a space between the light sources adjacent to each other among the light sources in the first direction.

In an exemplary embodiment, the first magnetic member may include a first sub-magnetic member and a second sub-magnetic member, which are respectively disposed at two edges facing each other of the upper surface of the support frame. The second magnetic member may include a third sub-magnetic member and a fourth sub-magnetic member, which are respectively disposed at two edges facing each other of the opposite surface of the light guide plate, and the third and fourth sub-magnetic members may respectively overlap the first and second sub-magnetic members.

In an exemplary embodiment, the display device further may include a top chassis disposed on the display panel. The top chassis may include a cover portion covering a front edge of the display panel and a side surface portion bent and extending from the cover portion to face the sidewall portion of the bottom chassis.

In an exemplary embodiment, the display device further may include a mold frame disposed between the bottom chassis and the display panel. The mold frame may include a support portion disposed between the display panel and the light guide plate and having a curved shape, a fixing portion disposed between the sidewall portion of the bottom chassis and the side surface portion of the top chassis, and a connection portion disposed on the sidewall portion of the bottom chassis to connect the support portion and the fixing portion.

Exemplary embodiments of the invention provide a method of manufacturing a display device, including providing a bottom chassis including a flat bottom portion, providing a support frame on the bottom portion, the support frame including a lower surface that is flat, an upper surface curved with respect to the first direction, and a first magnetic member disposed on the upper surface, providing a light guide plate on the upper surface, the light guide plate being flat and including a second magnetic member disposed on a surface thereof facing the upper surface, fixing the light guide plate to the upper surface, providing a light source unit to a position adjacent to one side portion of the light guide plate, and providing a display panel on the light guide plate.

In an exemplary embodiment, the fixing of the light guide plate may be performed by overlapping the first magnetic member with the second magnetic member to allow the flat light guide plate to be curved corresponding to a shape of the upper surface.

In an exemplary embodiment, the method further may include providing a mold frame on the light guide plate and the bottom chassis and providing a top chassis on the display panel.

In an exemplary embodiment, the display panel may be disposed between the top chassis and the mold frame and curved with respect to the first direction to correspond to the curved shape of the light guide plate.

According to the above, the light guide plate may be easily fixed to the curved upper surface.

In addition, the curved shape of the backlight unit and the display device may be easily maintained.

BRIEF DESCRIPTION OF THE DRAWINGS

The above and other advantages of the invention will become readily apparent by reference to the following detailed description when considered in conjunction with the accompanying drawings, in which:

FIGS. 11 and 12 are cross-sectional views showing other exemplary embodiments of backlight units according to the invention; and FIGS. 13A to 13H are cross-sectional views showing an exemplary embodiment of a method of manufacturing a display device according to the invention.

DETAILED DESCRIPTION

Figure 1:
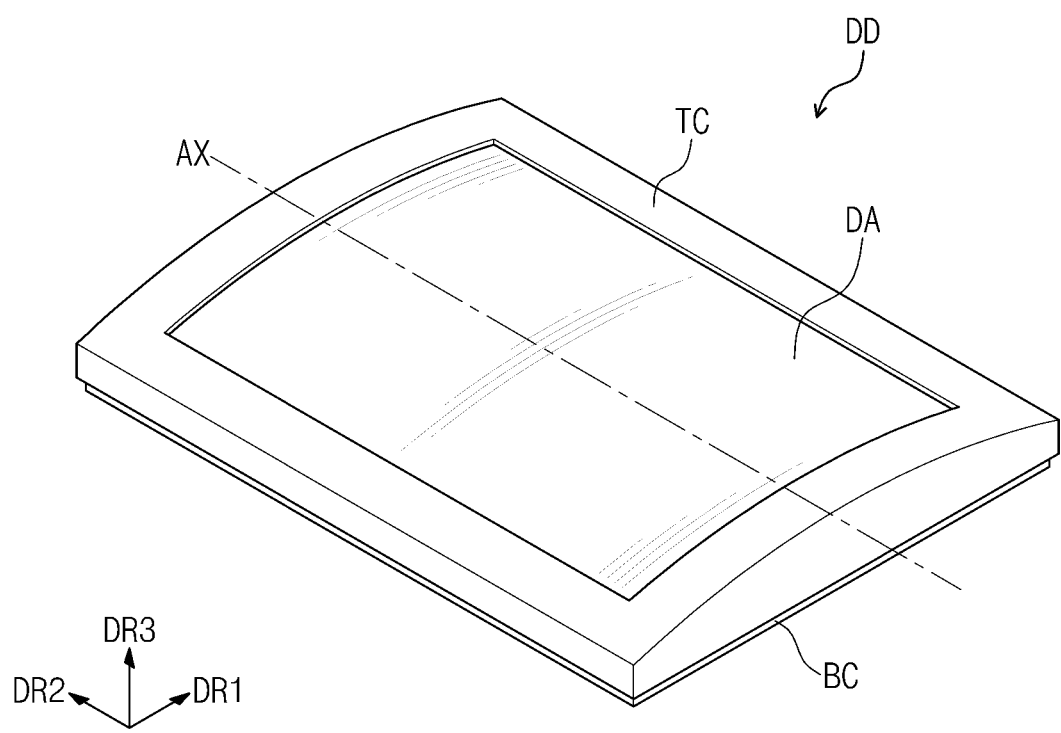
FIG. 1 is a perspective view showing an exemplary embodiment of a display device according to the invention.

The following description with reference to the accompanying drawings is provided to assist in a comprehensive understanding of various embodiments of the invention as defined by the claims and their equivalents, it includes various specific details to assist in that understanding but these are to be regarded as merely exemplary. Accordingly, those of ordinary skill in the art will recognize that various changes and modifications of the various embodiments described herein can be made without departing from the scope and spirit of the invention.

It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof. It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present.

Like numbers refer to like elements throughout. The use of the terms first, second, etc. do not denote any order or importance, but rather the terms first, second, etc. are used to distinguish one element from another. Like numerals refer to like elements throughout. It will be understood that when an element such as a layer, film, region, or substrate is referred to as being "on" another element, it can be directly on the other element or intervening elements may also be present. It is to be understood that the singular forms "a," "an," and "the" include plural referents unless the context clearly dictates otherwise.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. In an exemplary embodiment, when the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, when the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the invention, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. In an exemplary embodiment, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims.

Hereinafter, the invention will be explained in detail with reference to the accompanying drawings.

FIG. 1 is a perspective view showing a display device DD according to an exemplary embodiment of the invention.

Referring to FIG. 1, the display device DD according to the exemplary embodiment of the invention includes a display area DA curved with respect to a first direction DR1 to have a predetermined radius of curvature. The display area DA is curved with respect to a reference axis AX substantially parallel to a second direction DR2 on a plane defined by the first direction DR1 and the second direction DR2 crossing the first direction DR1.

In an exemplary embodiment, the display device DD may be applied to a center information display ("CID"), a wrist-type electronic device, a personal digital assistant ("PDA"), a portable multimedia player ("PMP"), a game unit, a tablet personal computer, a smart phone, a television set, or a large-sized electronic item, such as an outdoor billboard, and a small and medium-sized electronic item, such as a personal computer, a car navigation unit, a camera, etc., but it should not be limited thereto or thereby.

Figure 2:
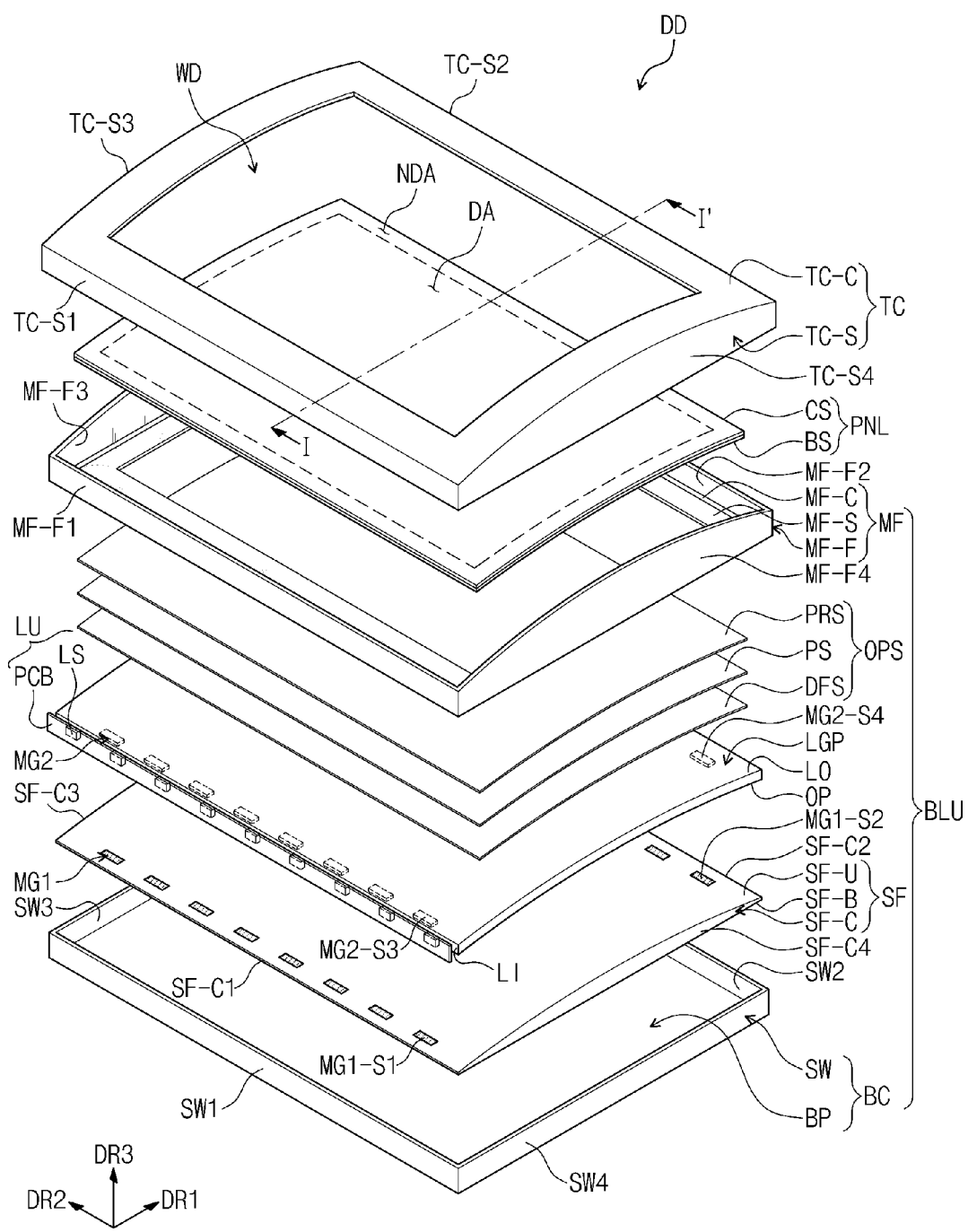
FIG. 2 is an exploded perspective view showing an exemplary embodiment of a display device according to the invention.
Figure 3:
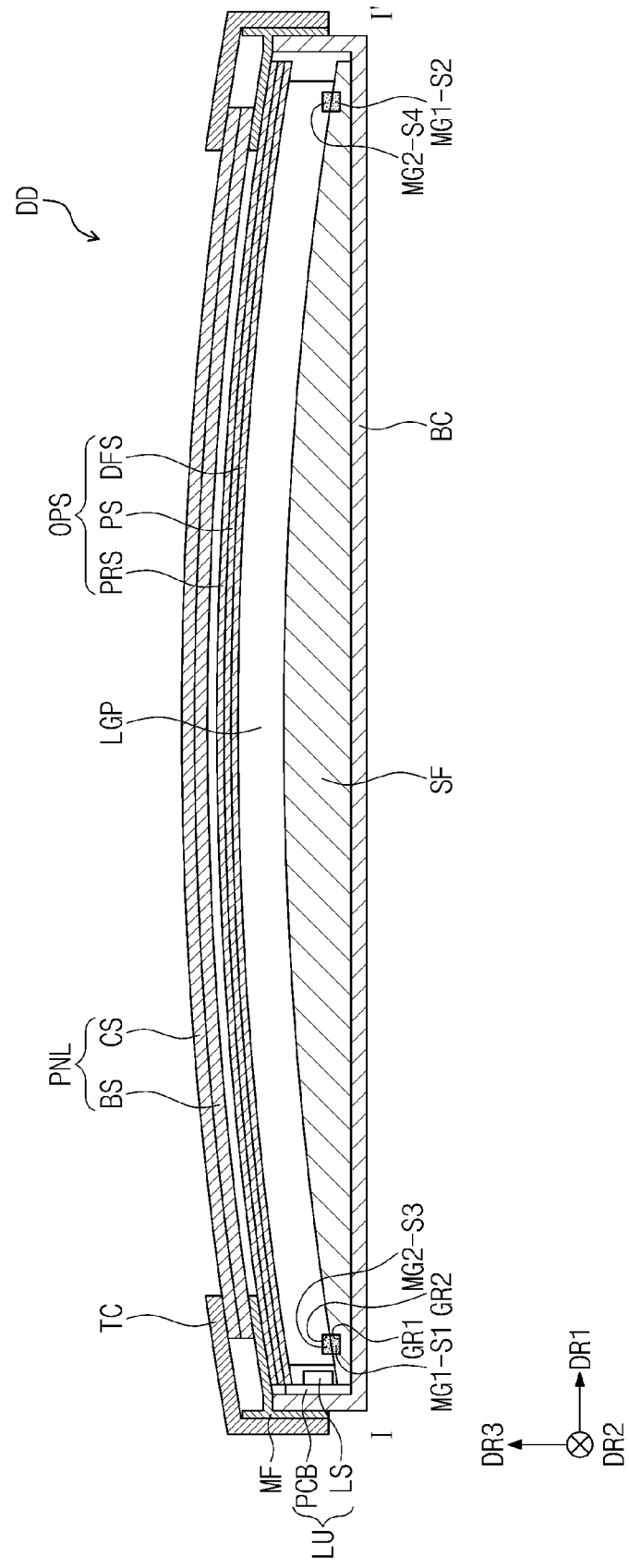
FIG. 3 is a cross-sectional view taken along line I-I' of FIG. 2.

FIG. 2 is an exploded perspective view showing the display device DD according to an exemplary embodiment of the invention, and FIG. 3 is a cross-sectional view taken along line I-I' of FIG. 2.

Referring to FIGS. 1 to 3, the display device DD includes a display panel PNL, a backlight unit BLU, and a top chassis TC.

The display panel PNL displays an image. The display panel PNL is a non-self-emissive display panel. In an exemplary embodiment, the display panel PNL may be a liquid crystal display ("LCD") panel, an electrowetting display panel, an electrophoretic display panel, or a micro-electromechanical system display panel, for example. For the convenience of explanation, the LCD panel will be described as the display panel in the exemplary embodiments.

In a plan view, the display panel PNL has a substantially rectangular shape with a pair of long sides and a pair of short sides. Here, a direction in which the short sides extend is referred to as the first direction DR1, and a direction in which the long sides extend is referred to as the second direction DR2.

In the illustrated exemplary embodiment, the display panel PNL is curved in the first direction DR1. In particular, the display panel PNL is convexly curved upward to have a predetermined radius of curvature in a cross-section taken along a third direction DR3 substantially vertical to the first and second directions DR1 and DR2. Here, the term "radius of curvature" used herein means a radius of curvature obtained when cutting an object in a direction perpendicular to a plane surface of the object along a direction to which the object is curved. However, in another exemplary embodiment, the display panel PNL may be curved along the first and second directions DR1 and DR2, but it should not be limited thereto or thereby.

The display panel PNL includes a display area DA displaying the image and a non-display area NDA disposed at a position adjacent to at least one side of the display area DA. The non-display area NDA may be covered by the top chassis TC.

The display panel PNL includes a base substrate BS, an opposite substrate CS facing the base substrate BS, and a liquid crystal layer (not shown) disposed between the base substrate BS and the opposite substrate CS. According to the exemplary embodiment, the base substrate BS includes a plurality of pixel electrodes (not shown) and a plurality of thin film transistors ("TFTs") (not shown) electrically connected to the pixel electrodes in a one-to-one correspondence. Each of the TFTs switches a driving signal applied to a corresponding electrode. In addition, the opposite substrate CS may include a common electrode (not shown) that generates electric fields with the pixel electrodes to control an alignment of liquid crystal molecules of the liquid crystal layer. The display panel PNL drives the liquid crystal layer to display the image to the third direction DR3.

The backlight unit BLU is disposed under the display panel PNL to provide a light to the display panel PNL. The backlight unit BLU includes a bottom chassis BC, a support frame SF, a first magnetic member MG1, a light guide plate LGP, a second magnetic member MG2, a light source unit LU, optical sheets OPS, and a mold frame MF.

The bottom chassis BC is disposed under the display panel PNL to accommodate the support frame SF, the light guide plate LGP, the optical sheets OPS, and the light source unit LU. The bottom chassis BC includes a bottom portion BP facing a rear surface of the display panel PNL and a sidewall portion SW bent and extending from the bottom portion BP.

The bottom portion BP may be substantially parallel to a plane defined by the first and second directions DR1 and DR2. The bottom portion BP may have a substantially rectangular shape corresponding to that of the display panel PNL in a plan view, for example.

The sidewall portion SW extends in the third direction DR3 from the bottom portion BP to define an inner space with the bottom portion BP. The sidewall portion SW includes first and second sidewall portions SW1 and SW2 corresponding to the long sides of the display panel PNL and third and fourth sidewall portions SW3 and SW4 corresponding to the short sides of the display panel PNL. The first to fourth sidewall portions SW1 to SW4 have a constant height and are disposed at an edge of the bottom portion BP. In the illustrated exemplary embodiment, the height of the first to fourth sidewall portions SW1 to SW4 indicates a length of the sidewall portions extending from the bottom portion BP along the third direction DR3. However, in another exemplary embodiment, the first to fourth sidewall portions SW1 to SW4 may have different heights from each other.

The support frame SF is disposed on the bottom portion BP. The support frame SF has a substantially rectangular shape corresponding to that of the bottom portion BP in a plan view. In an exemplary embodiment, the support frame SF has an area smaller than an area of the bottom portion BP. However, the area of the support frame SF may be substantially the same as the area of the bottom portion BP according to another exemplary embodiment.

The support frame SF includes a lower surface SF-B contacting the bottom portion BP, an upper surface SF-U facing the lower surface SF-B, and a connection surface SF-C connecting the lower surface SF-B and the upper surface SF-U.

The lower surface SF-B may be a flat surface substantially parallel to the bottom portion BP. The upper surface SF-U may have a curved shape with respect to the first direction DR1 in accordance with the curved shape of the display panel PNL. The connection surface SF-C is substantially vertical with respect to the bottom portion BP and provides four side surfaces of the support frame SF. The connection surface SF-C includes first and second connection surfaces SF-C1 and SF-C2 spaced apart from each other in the first direction DR1 to face each other and third and fourth connection surfaces SF-C3 and SF-C4 spaced apart from each other in the second direction DR2 to face each other.

The first and second connection surfaces SF-C1 and SF-C2 extend in the second direction DR2 and are substantially parallel to each other. The first connection surface SF-C1 is disposed to face the first sidewall portion SW1, and the second connection surface SF-C2 is disposed to face the second sidewall portion SW2. The first and second connection surfaces SF-C1 and SF-C2 may have a constant height.

The third and fourth connection surfaces SF-C3 and SF-C4 extend in the first direction DR1 and are substantially parallel to each other. The third connection surface SF-C3 is disposed to face the third sidewall portion SW3, and the fourth connection surface SF-C4 is disposed to face the fourth sidewall portion SW4. The third and fourth connection surfaces SF-C3 and SF-C4 may have a height increasing as closer to a center portion along the first direction DR1.

In the illustrated exemplary embodiment, the height of each of the first to fourth connection surfaces SF-C1 to SF-C4 corresponds to a length of the first to fourth connection surfaces SF-C1 to SF-C4 extending from the lower surface SF-B along the third direction DR3.

The first magnetic member MG1 may be disposed at at least one edge of the upper surface SF-U of the support frame SF. A first recess GR1 is defined in the upper surface SF-U and placed at a position corresponding to the first magnetic member MG1. The first magnetic member MG1 is inserted into the first recess GR1.

In an exemplary embodiment, the first magnetic member MG1 has a substantially rectangular shape, for example, but the shape of the first magnetic member MG1 should not be limited to the rectangular shape. That is, in another exemplary embodiment, the first magnetic member MG1 may have various other shapes such as a circular shape, a polygonal shape, or the like.

In the illustrated exemplary embodiment, the first magnetic member MG1 includes a first sub-magnetic member MG1-S1 and a second sub-magnetic member MG1-S2, which are respectively disposed at two edges extending in the second direction DR2. Each of the first and second magnetic members MG1-S1 and MG1-S2 may be provided in a plural number. The first sub-magnetic members MG1-S1 are arranged in the second direction DR2 and spaced apart from each other at regular intervals. The second sub-magnetic members MG1-S2 are arranged in the second direction DR2 and spaced apart from each other at regular intervals. In the exemplary embodiment, the first sub-magnetic members MG1-S1 face the second sub-magnetic members MG1-S2, but may be alternately arranged with the second sub-magnetic members MG1-S2.

The light guide plate LGP is disposed under the display panel PNL and above the support frame SF to guide a light incident thereto to the display panel PNL. The light guide plate LGP has a flexibility. The light guide plate LGP in a flat state is bent to correspond to the shape of the upper surface SF-U of the support frame SF. In an exemplary embodiment, the light guide plate LGP includes a transparent polymer resin, such as polycarbonate, polymethyl methacrylate, etc.

The light guide plate LGP includes a light incident surface LI, a light output surface LO, and an opposite surface OP.

The light emitted from the light source unit LU is incident to the light guide plate LGP through the light incident surface LI. In the case that the light source unit LU is disposed to face at least one side surface of side surfaces connecting two largest surfaces of the light guide plate LGP, the at least one side surface may be referred to as the light incident surface LI.

The light output surface LO may be one of the two largest surfaces of the light guide plate LGP. The light output surface LO may be a flat surface facing the display panel PNL. The light incident to the light guide plate LGP through the light incident surface LI travels to the display panel PNL through the light output surface LO along the third direction DR3.

The opposite surface OP may be the other one of the two largest surfaces of the light guide plate LGP and faces the light output surface LO. The light incident to the light guide plate LGP through the light incident surface LI are reflected between the light output surface LO and the opposite surface OP while traveling through the light guide plate LGP.

The second magnetic member MG2 is disposed at least one edge of the opposite surface OP of the light guide plate LGP. A second recess GR2 is defined in the opposite surface OP and placed at a position corresponding to the second magnetic member MG2. The second magnetic member MG2 is inserted into the second recess GR2. The second magnetic member MG2 is disposed to face the first magnetic member MG1. An attractive force acts between the first magnetic member MG1 and the second magnetic member MG2.

In the illustrated exemplary embodiment, the second magnetic member MG2 has a substantially rectangular shape, for example, but the shape of the second magnetic member MG2 should not be limited to the rectangular shape. That is, in another exemplary embodiment, the second magnetic member MG2 may have various other shapes such as a circular shape, a polygonal shape, or the like, for example, as long as the second magnetic member MG2 overlaps at least a portion of the first magnetic member MG1.

In the illustrated exemplary embodiment, the second magnetic member MG2 includes a third sub-magnetic member MG2-S3 and a fourth sub-magnetic member MG2-S4, which are respectively disposed at two edges of the opposite surface OP extending in the second direction DR2. Each of the third and fourth magnetic members MG2-S3 and MG2-S4 may be provided in a plural number. The third sub-magnetic members MG2-S3 are arranged in the second direction DR2 and spaced apart from each other at regular intervals. The fourth sub-magnetic members MG2-S4 are arranged in the second direction DR2 and spaced apart from each other at regular intervals. In the illustrated exemplary embodiment, the third sub-magnetic members MG2-S3 face the fourth sub-magnetic members MG2-S4, but may be alternately arranged with the fourth sub-magnetic members MG2-S4.

Each of the third sub-magnetic members MG2-S3 is disposed to face a corresponding first sub-magnetic member of the first sub-magnetic members MG1-S1. Each of the fourth sub-magnetic members MG2-S4 is disposed to face a corresponding second sub-magnetic member of the second sub-magnetic members MG1-S2.

The light source unit LU generates the light. The light source unit LU is disposed to face the light incident surface LI. In the illustrated exemplary embodiment, the light source unit LU is disposed to correspond to one long side of the display panel PNL, but it should not be limited thereto or thereby. In another exemplary embodiment, the light source unit LU may be provided in a plural number, and the light source units LU may be disposed to correspond to the long sides and/or the short sides of the display panel PNL.

The light source unit LU includes a printed circuit board PCB and a light source LS. The printed circuit board PCB includes electrical wirings printed thereon to supply a power source voltage to the light source LS. In the illustrated exemplary embodiment, the printed circuit board PCB has a rectangular plate shape elongated in the second direction DR2.

The printed circuit board PCB may include a light source controller (not shown) connected to the light source LS. The light source controller (not shown) analyzes the image displayed through the display panel PNL and output a signal to control a brightness of the light source LS. In an exemplary embodiment, the light source controller (not shown) may be disposed (e.g., mounted) on a separate circuit board, but it should not be limited thereto or thereby.

The light source LS is disposed (e.g., mounted) on an upper surface of the printed circuit board PCB. The light emitted from the light source LS is incident to the light guide plate LGP. The light source LS may be a point light source or a line light source, but it should not be limited thereto or thereby. In the illustrated exemplary embodiment, the point light source, e.g., a light emitting diode ("LED"), will be described as the light source LS. In FIG. 2, the LED is provided in a plural number, and the LEDs are arranged in one line on the substrate SUB, but they should not be limited thereto or thereby. In an exemplary embodiment, the light source LS may be realized in one LED or a plurality of LED groups, for example. In the illustrated exemplary embodiment, the light sources LS may be arranged in the second direction DR2 and spaced apart from each other at regular intervals.

The optical sheet OPS is disposed between the display panel PNL and the light guide plate LGP. The optical sheet OPS controls the light emitted from the light source LS. The optical sheet OPS is curved to correspond to the curved shape of the light guide plate LGP.

The optical sheet OPS includes a diffusion sheet DFS, a prism sheet PS, and a protective sheet PRS, which are stacked on the light guide plate LGP.

The diffusion sheet DFS diffuses the light. The prism sheet PS condenses the light diffused by the diffusion sheet DFS to a direction substantially perpendicular to the plane surface of the display panel PNL. The light is perpendicularly incident to the display panel PNL after passing through the prism sheet PS. The protective sheet PRS is disposed on the prism sheet PS. The protective sheet PRS protects the prism sheet PS from an external impact. In the illustrated exemplary embodiment, the optical sheet OPS includes one diffusion sheet DFS, one prism sheet PS, and one protective sheet PRS, but it should not be limited thereto or thereby. In an exemplary embodiment, at least one of the diffusion sheet DFS, the prism sheet PS, and the protective sheet PRS of the optical sheet OPS may be provided in a plural number and one or more sheets may be omitted when necessary, for example. Also, the stacking order of the diffusion sheet DFS, the prism sheet PS, and the protective sheet PRS may be changed.

The mold frame MF is disposed under the display panel PNL to support the display panel PNL. In addition, the mold frame MF holds a position of the optical sheet OPS. The mold frame MF is placed at positions corresponding to four sides of the display panel PNL or at a position corresponding to at least a portion of the four sides of the display panel PNL. In an exemplary embodiment, the mold frame MF may have a substantially rectangular ring-shape in a plan view.

The mold frame MF includes a support portion MF-S disposed between the display panel PNL and the optical sheet OPS, a fixing portion MF-F disposed between the bottom chassis BC and the top chassis TC, and a connection portion MF-C connecting the support portion MF-S and the fixing portion MF-F.

The support portion MF-S has a curved shape corresponding to the curved shape of the display panel PNL and the optical sheet OPS. The support portion MF-S supports the display panel PNL and holds a position of the optical sheet OPS disposed under the support portion MF-S.

The connection portion MF-C is disposed on the sidewall portion SW of the bottom chassis BC. The connection portion MF-C holds a position of the support portion MF-S.

The fixing portion MF-F is connected to the connection portion MF-C and disposed to face the sidewall portion SW of the bottom chassis BC. The fixing portion MF-F maintains a distance between the top chassis TC and the bottom chassis BC.

The fixing portion MF-F serves as four side portions of the mold frame MF. The fixing portion MF-F includes first and second fixing portions MF-F1 and MF-F2 spaced apart from each other in the first direction DR1 and facing each other and third and fourth fixing portions MF-F3 and MF-F4 spaced apart from each other in the second direction DR2 and facing each other.

The first and second fixing portions MF-F1 and MF-F2 extend in the second direction DR2 and are substantially parallel to each other. The first fixing portion MF-F1 is disposed to face the first sidewall portion SW1, and the second fixing portion MF-F2 is disposed to face the second sidewall portion SW2. Each of the first and second fixing portions MF-F1 and MF-F2 has a constant height.

The third and fourth fixing portions MF-F3 and MF-F4 extend in the first direction DR1 and are substantially parallel to each other. The third fixing portion MF-F3 is disposed to face the third sidewall portion SW3, and the fourth fixing portion MF-F4 is disposed to face the fourth sidewall portion SW4. Each of the third and fourth fixing portions MF-F3 and MF-F4 has a height increasing as closer to a center portion in the first direction DR1.

Here, the height of each of the first to fourth fixing portions MF-F1 to MF-F4 corresponds to a length of each of the first to fourth fixing portions MF-F1 to MF-F4 extending in the third direction DR3 from a plane defined by the first and second directions DR1 and DR2.

In an exemplary embodiment, the mold frame MF may be provided in a single unit, but it should not be limited thereto or thereby. That is, the mold frame MF may be provided by assembling plural parts or by disposing the plural parts to be spaced apart from each other. In an exemplary embodiment, the mold frame MF includes an organic material such as a polymer resin, but it should not be limited thereto or thereby.

The top chassis TC is disposed on the display panel PNL. The top chassis TC covers a front edge of the display panel PNL, i.e., the non-display area NDA. The top chassis TC is provided with a display window WD defined therethrough to expose the display area DA of the display panel PNL. In an exemplary embodiment, the top chassis TC includes a plastic, aluminum, or stainless steel. The top chassis TC is curved with respect to the first direction DR1 to correspond to the shape of the display panel PNL.

The top chassis TC includes a cover portion TC-C and a side surface portion TC-S bent and extending from the cover portion TC-C.

The cover portion TC-C overlaps the non-display area NDA of the display panel PNL in a plan view. The cover portion TC-C has a shape corresponding to the curved shape of the display panel PNL.

The side surface portion TC-S includes four side surfaces of the top chassis TC. The side surface portion TC-S is disposed to face the sidewall portion SW of the bottom chassis BC such that the fixing portion MF-F of the mold frame MF is disposed between the side surface portion TC-S and the sidewall portion SW of the bottom chassis BC.

The side surface portion TC-S includes first and second side surface portions TC-S1 and TC-S2 spaced apart from each other in the first direction DR1 to face each other and third and fourth side surface portions TC-S3 and TC-S4 spaced apart from each other in the second direction DR2 to face each other.

The first and second side surface portions TC-S1 and TC-S2 extend in the second direction DR2 and are substantially parallel to each other. The first side surface portion TC-S1 is disposed to face the first fixing portion MF-F1, and the second side surface portion TC-S2 is disposed to face the second fixing portion MF-F2. Each of the first and second side surface portions TC-S1 and TC-S2 has a constant height.

The third and fourth side surface portions TC-S3 and TC-S4 extend in the first direction DR1 and are substantially parallel to each other. The third side surface portion TC-S3 is disposed to face the third fixing portion MF-F3, and the fourth side surface portion TC-S4 is disposed to face the fourth fixing portion MF-F4. Each of the third and fourth side surface portions TC-S3 and TC-S4 has a height increasing as closer to a center portion in a first direction DR1.

In the illustrated exemplary embodiment, the height of each of the first to fourth side surface portions TC-S1 to TC-S4 corresponds to a length of each of the first to fourth side surface portions TC-S1 to TC-S4 extending from a plane defined by the first and second directions DR1 and DR2 to the cover portion TC-C.

Figure 4:
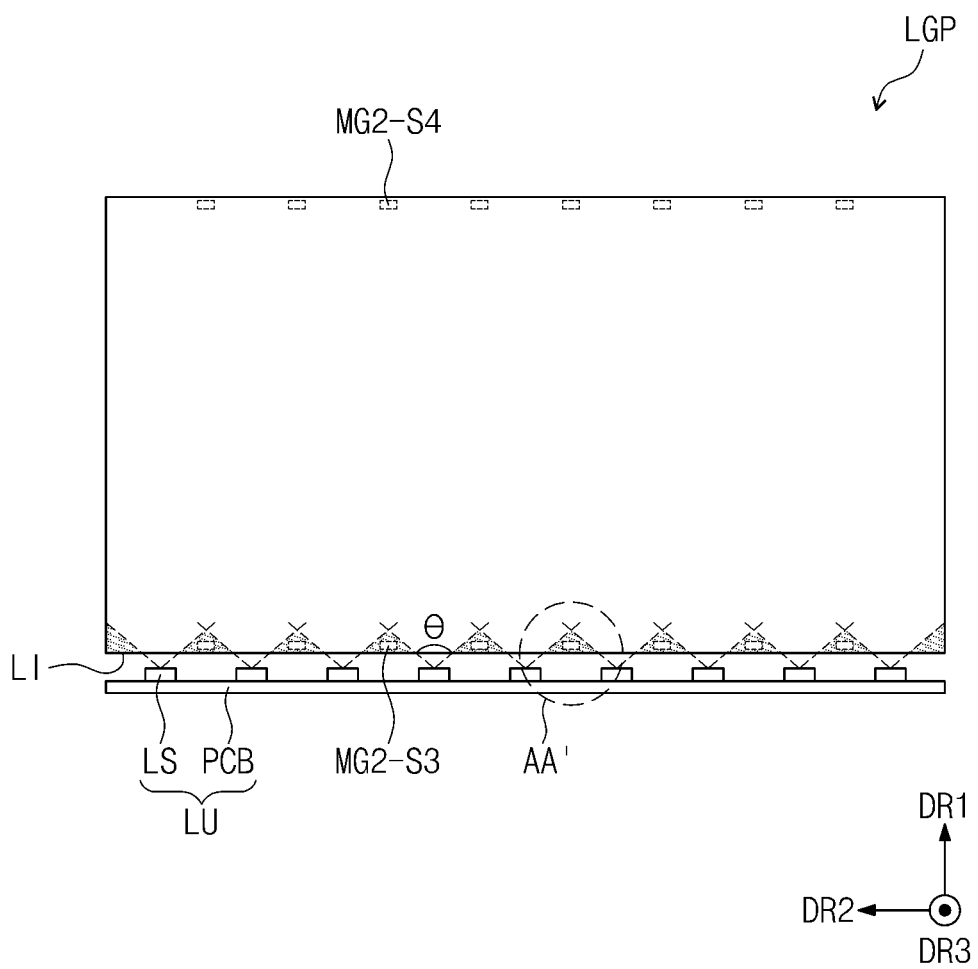
FIG. 4 is a plan view showing an exemplary embodiment of a backlight unit according to the invention.
Figure 5:
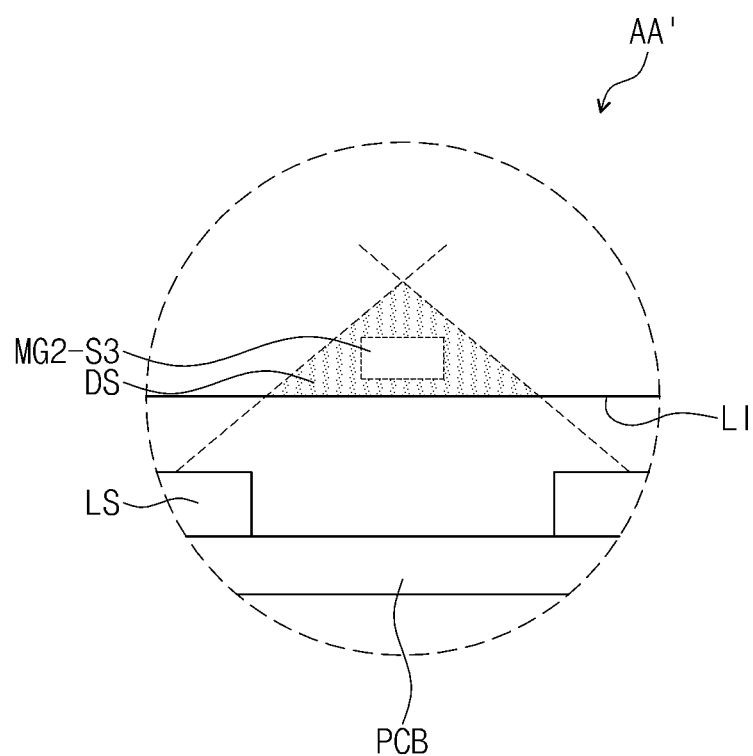
FIG. 5 is an enlarged view showing a portion AA' of FIG. 4.

FIG. 4 is a plan view showing a backlight unit according to an exemplary embodiment of the invention, and FIG. 5 is an enlarged view showing a portion AA' of FIG. 4.

Referring to FIGS. 2 to 5, the light source unit LU is disposed to face the light incident surface LI of the light guide plate LGP. The light sources LS emits the light to the light incident surface LI. An emission angle θ, of the light emitted from each of the light sources LS is about 120 degrees. Accordingly, a dead space DS, to which the light is not provided, exists in the light guide plate LGP to correspond to a position between the light sources LS adjacent to each other.

The third sub-magnetic members MG2-S3 may be disposed in a space between the light sources LS adjacent to each other among the light sources LS in a direction opposite to the first direction DR1. The third sub-magnetic members MG2-S3 may be alternately arranged with the light sources LS in a zigzag shape. The third sub-magnetic members MG2-S3 may be disposed in the dead space DS such that the third sub-magnetic members MG2-S3 do not face a surface of the light sources LS, from which the light is emitted. Therefore, the light emitted from the light sources LS may be prevented from being scattered by the third sub-magnetic members MG2-S3.

In order to fix the flat light guide plate to the bottom chassis having the curved bottom surface, a separate fixing part is desired to fix the light guide plate to the bottom chassis. In the case that the flat light guide plate is fixed to the bottom chassis, the light guide plate curved to correspond to the curved bottom surface of the bottom chassis may be damaged without being fixed to the bottom chassis due to a force, i.e., a repulsive force, in which the curved light guide plate returns to its original shape.

However, according to the illustrated exemplary embodiment, the bottom portion BP of the bottom chassis BC is flat, and the support frame SF having the curved upper surface SF-U is disposed on the bottom portion BP. Thus, the flat light guide plate LGP is curved along the upper surface SF-U on the support frame SF. A stress applied to the bottom chassis BC may be distributed by the support frame SF disposed between the bottom portion BP and the curved light guide plate LGP.

In addition, since the first magnetic member MG1 disposed on the upper surface SF-U of the support frame SF and the second magnetic member MG2 disposed on the opposite surface OP of the light guide plate LGP are attached to each other, the light guide plate LGP maintains the curved shape and is fixed to the support frame SF. As a result, the backlight unit BLU may be prevented from being deformed, and the light guide plate LGP may be prevented from being damaged.

Hereinafter, other exemplary embodiments of the invention will be described with reference to accompanying drawings. For the convenience of explanation, different features from those of the previously described embodiment will be mainly described. In addition, in FIGS. 6 to 10, the same reference numerals denote the same elements in FIGS. 1 to 5, and thus detailed descriptions of the same elements will be omitted.

Each of FIGS. 6 to 10 is an exploded perspective view showing a backlight unit according to another exemplary embodiment of the invention. In FIGS. 6 to 10, the first magnetic member MG1 overlaps the second magnetic member MG2 in a plan view. Hereinafter, the first and second magnetic members MG1 and MG2 different from those of the previously described embodiment will be described with reference to FIGS. 6 to 10.

Figure 6:
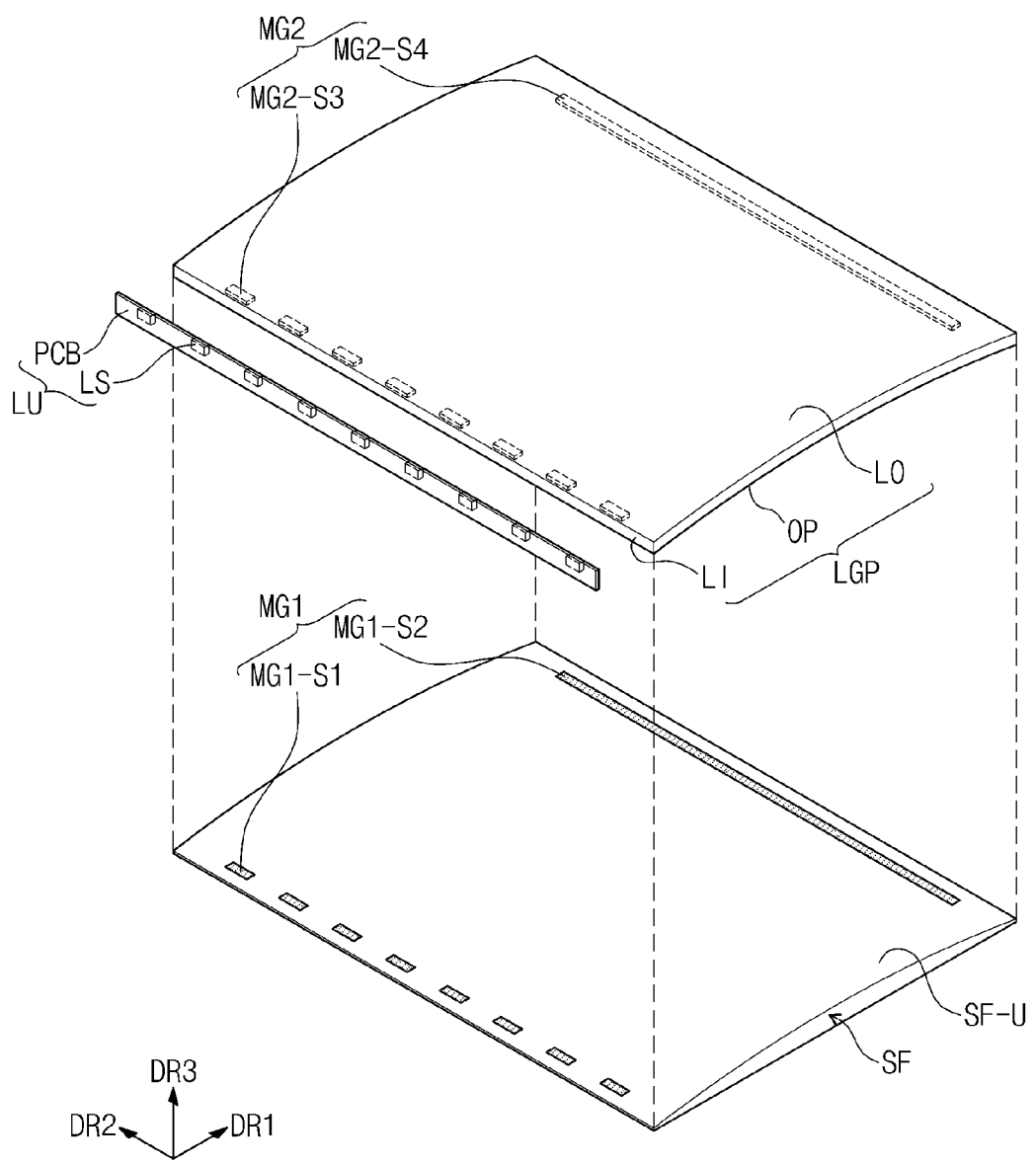
FIGS. 6 to 10 are exploded perspective views showing other exemplary embodiments of backlight units according to the invention.

Referring to FIG. 6, the first magnetic member MG1 includes a first sub-magnetic member MG1-S1 and a second sub-magnetic member MG1-S2, which are respectively placed at two edges extending in the second direction DR2 of the upper surface SF-U. The first sub-magnetic member MG1-S1 may be provided in a plural number. The first sub-magnetic members MG1-S1 are arranged in the second direction DR2 and spaced apart from each other at regular intervals. The second sub-magnetic member MG1-S2 is provided in single number and extends in the second direction DR2.

The second magnetic member MG2 includes a third sub-magnetic member MG2-S3 and a fourth sub-magnetic member MG2-S4, which are respectively placed at two edges extending in the second direction DR2 of the opposite surface OP. The third sub-magnetic member MG2-S3 may be provided in a plural number. The third sub-magnetic members MG2-S3 are arranged in the second direction DR2 and spaced apart from each other at regular intervals. The fourth sub-magnetic member MG2-S4 is provided in single number and extends in the second direction DR2.

The third sub-magnetic member MG2-S3 overlaps the first sub-magnetic member MG1-S1, and the fourth sub-magnetic member MG2-S4 overlaps the second sub-magnetic member MG1-S2.

Figure 7:
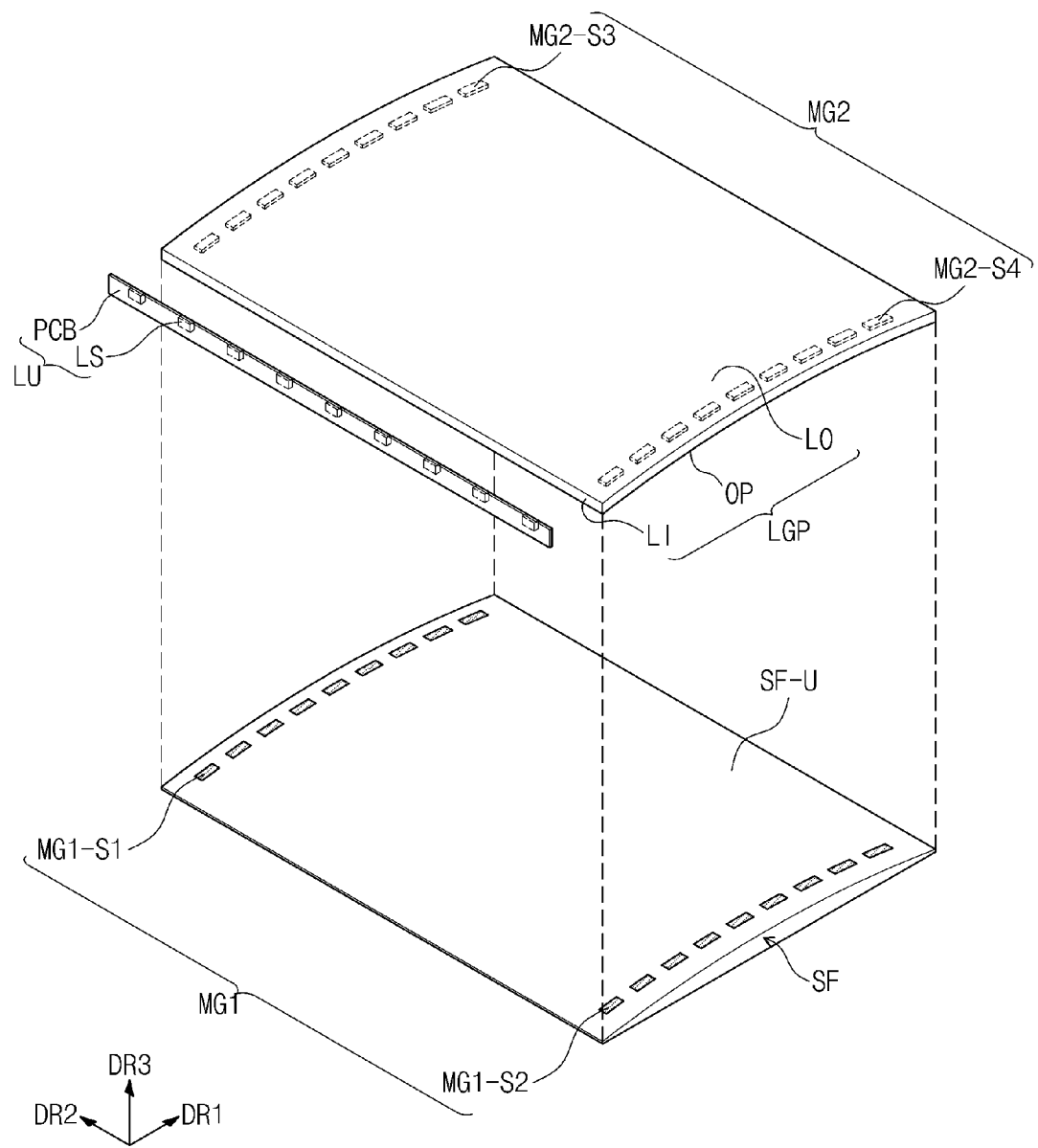

Referring to FIG. 7, the first magnetic member MG1 includes a first sub-magnetic member MG1-S1 and a second sub-magnetic member MG1-S2, which are respectively placed at two edges extending in the first direction DR1 and spaced apart from each other in the second direction DR2 of the upper surface SF-U. The first sub-magnetic member MG1-S1 may be provided in a plural number. The first sub-magnetic members MG1-S1 are arranged in the first direction DR1 and spaced apart from each other at regular intervals. The second sub-magnetic member MG1-S2 is provided in a plural number and arranged in the first direction DR1 and spaced apart from each other at regular intervals.

The second magnetic member MG2 includes a third sub-magnetic member MG2-S3 and a fourth sub-magnetic member MG2-S4, which are respectively placed at two edges extending in the first direction DR1 and spaced apart from each other in the second direction DR2 of the opposite surface OP. The third sub-magnetic member MG2-S3 may be provided in a plural number. The third sub-magnetic members MG2-S3 are arranged in the first direction DR1 and spaced apart from each other at regular intervals. The fourth sub-magnetic member MG2-S4 is provided in a plural number and arranged in the first direction DR1 at regular intervals.

The third sub-magnetic member MG2-S3 overlaps the first sub-magnetic member MG1-S1, and the fourth sub-magnetic member MG2-S4 overlaps the second sub-magnetic member MG1-S2.

Figure 8:
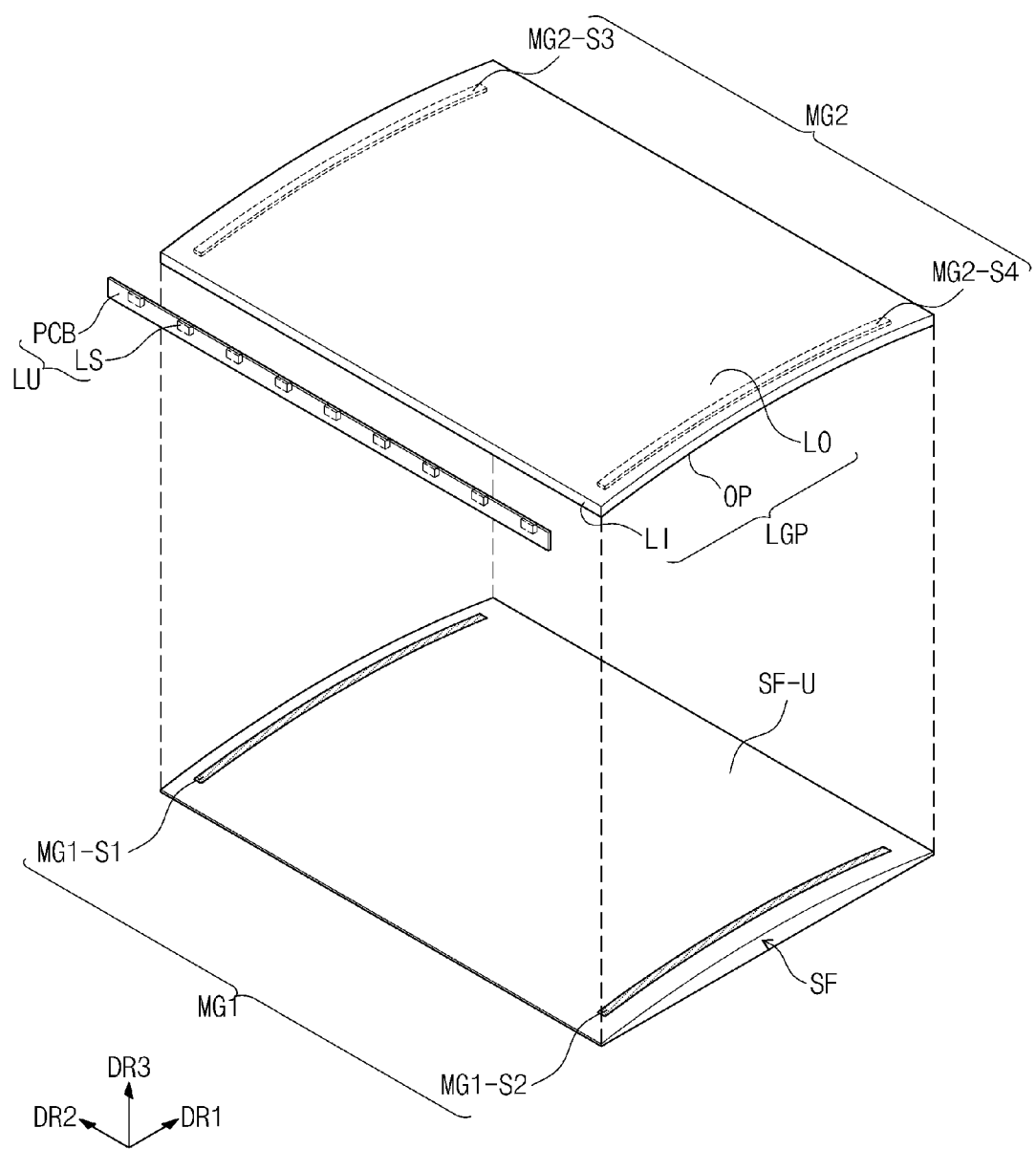

Referring to FIG. 8, the first magnetic member MG1 includes a first sub-magnetic member MG1-S1 and a second sub-magnetic member MG1-S2, which are respectively placed at two edges extending in the first direction DR1 and spaced apart from each other in the second direction DR2 of the upper surface SF-U. Each of the first and second sub-magnetic members MG1-S1 and MG1-S2 is provided in a single number and extends in the first direction DR1.

The second magnetic member MG2 includes a third sub-magnetic member MG2-S3 and a fourth sub-magnetic member MG2-S4, which are respectively placed at two edges extending in the first direction DR1 and spaced apart from each other in the second direction DR2 of the opposite surface OP. Each of the third and fourth sub-magnetic members MG2-S3 and MG2-S4 is provided in a single number and extends in the first direction DR1.

The third sub-magnetic member MG2-S3 overlaps the first sub-magnetic member MG1-S1, and the fourth sub-magnetic member MG2-S4 overlaps the second sub-magnetic member MG1-S2.

Figure 9:
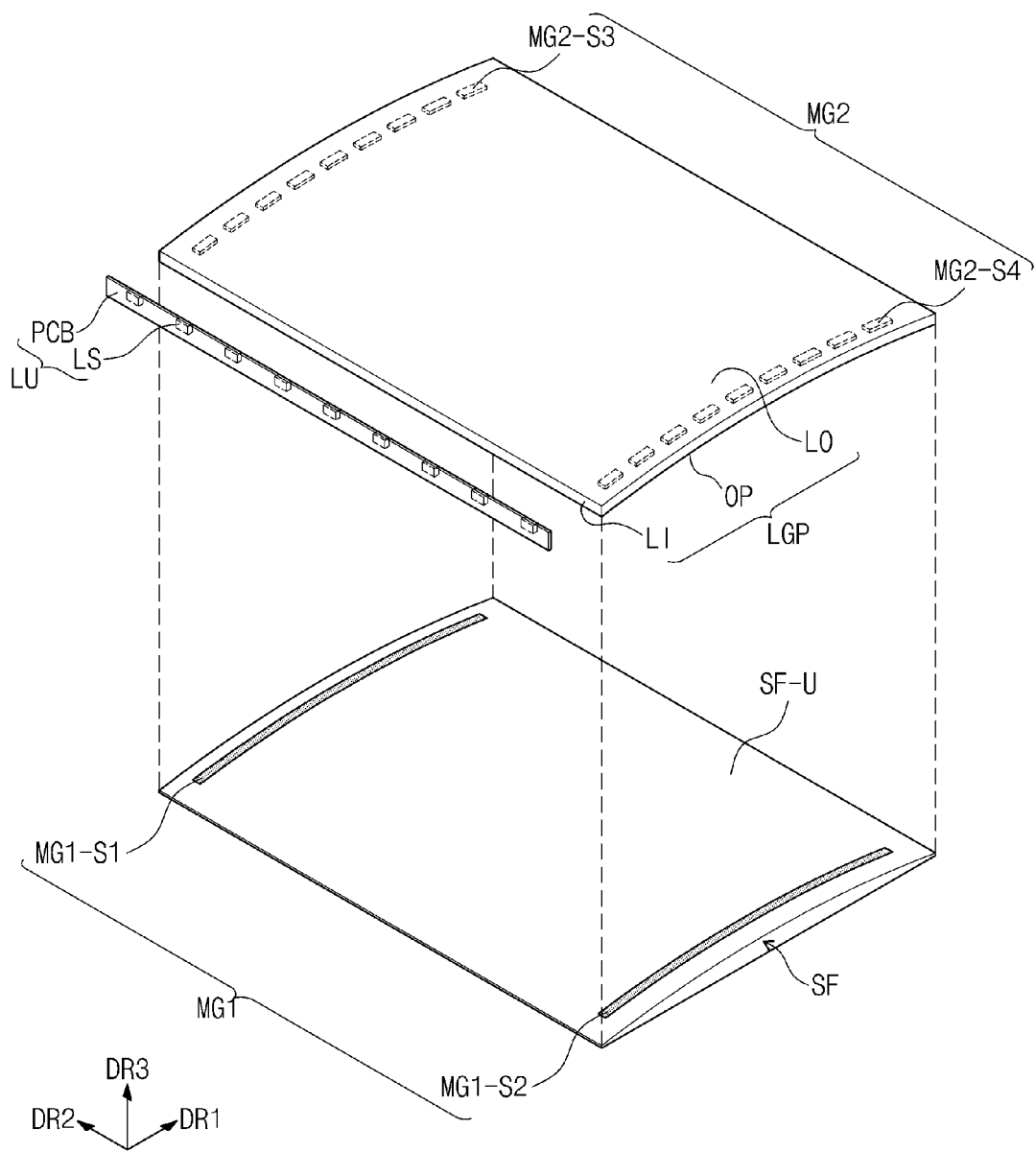

Referring to FIG. 9, the first magnetic member MG1 includes a first sub-magnetic member MG1-S1 and a second sub-magnetic member MG1-S2, which are respectively placed at two edges extending in the first direction DR1 and spaced apart from each other in the second direction DR2 of the upper surface SF-U. Each of the first and second sub-magnetic members MG1-S1 and MG1-S2 is provided in a single number and extends in the first direction DR1.

The second magnetic member MG2 includes a third sub-magnetic member MG2-S3 and a fourth sub-magnetic member MG2-S4, which are respectively placed at two edges extending in the first direction DR1 and spaced apart from each other in the second direction DR2 of the opposite surface OP. Each of the third and fourth sub-magnetic members MG2-S3 and MG2-S4 may be provided in a plural number. The third sub-magnetic members MG2-S3 are arranged in the first direction DR1 and spaced apart from each other at regular intervals. The fourth sub-magnetic members MG2-S4 are arranged in the first direction DR1 and spaced apart from each other at regular intervals.

The third sub-magnetic member MG2-S3 overlaps the first sub-magnetic member MG1-S1, and the fourth sub-magnetic member MG2-S4 overlaps the second sub-magnetic member MG1-S2.

Figure 10:
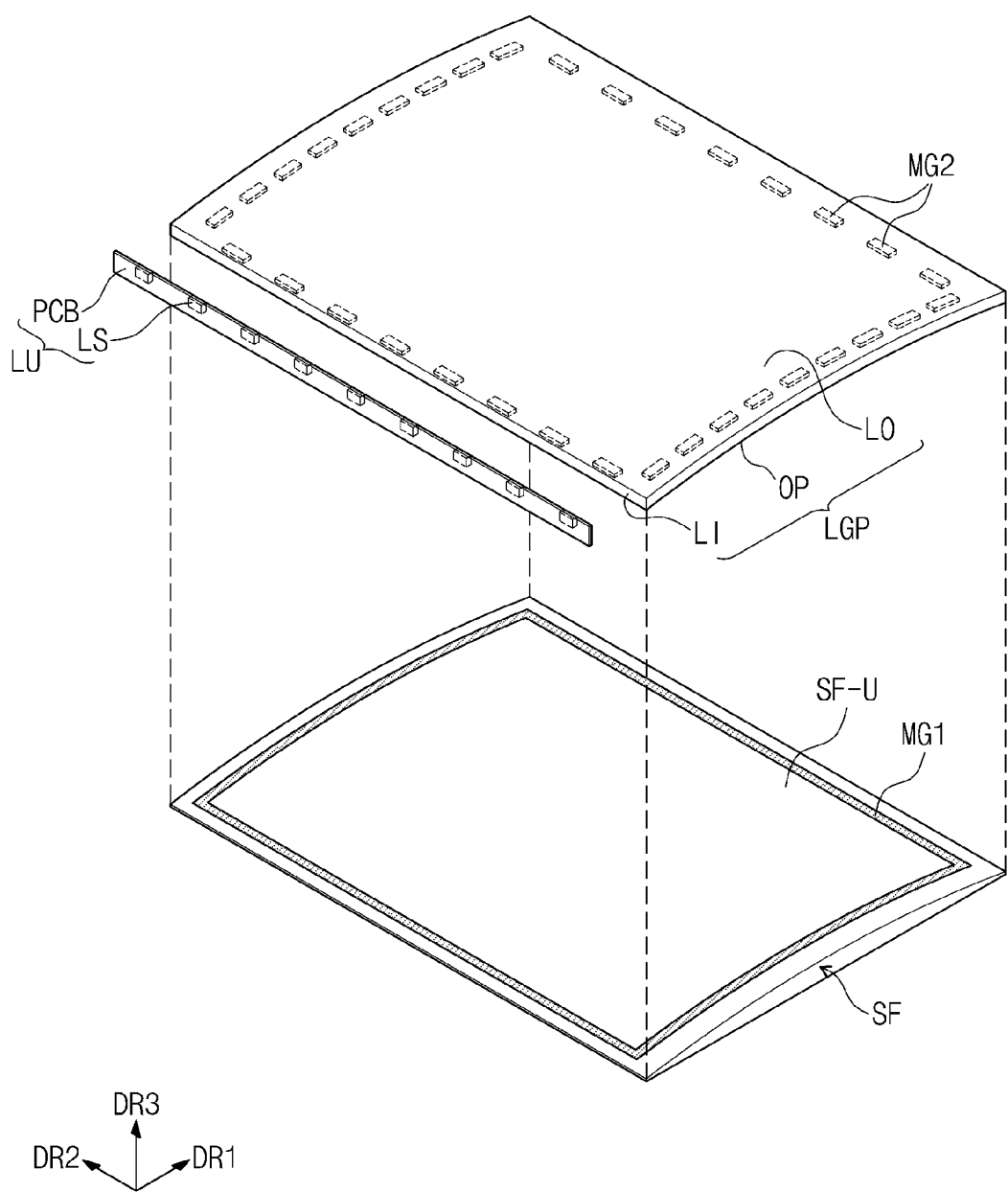

Referring to FIG. 10, the first magnetic member MG1 is disposed along an edge of the upper surface SF-U. In the illustrated exemplary embodiment, the first magnetic member MG1 has a substantially ring shape in a plan view, but the shape of the first magnetic member MG1 should not be limited to the ring shape. Although not shown in FIG. 10, the first magnetic member MG1 may be provided in a plural number, and the first magnetic members MG1 are arranged spaced apart from each other at regular intervals.

The second magnetic member MG2 is disposed along an edge of the opposite surface OP. The second magnetic member MG2 is provided in a plural number. The second magnetic members MG2 are arranged along the edge of the opposite surface OP and spaced apart from each other at regular intervals. The second magnetic member MG2 is disposed to overlap the first magnetic member MG1.

According to another exemplary embodiment, the backlight unit BLU may include a bottom frame in which a bottom chassis BC and a support frame SF are unitary with each other. Hereinafter, the bottom frame will be described with reference to FIGS. 11 and 12.

FIGS. 11 and 12 are cross-sectional views showing backlight units according to other exemplary embodiments of the invention. Hereinafter, bottom frames BF-1 and BF-2, each of which is configured to include the bottom chassis BC (refer to FIG. 3) and the support frame SF (refer to FIG. 3), will be described in detail.

Referring to FIG. 11, the bottom frame BF-1 includes a bottom surface BC-B, a sidewall surface BC-W, a support surface BC-S, and an extension surface BC-E.

The bottom surface BC-B is substantially parallel to a plane defined by the first and second directions DR1 and DR2. The sidewall surface BC-W is bent and extends from the bottom surface BC-B.

The support surface BC-S is protruded from the bottom surface BC-B to the third direction DR3. The support surface BC-S is provided as a curved surface with respect to the first direction DR1. The extension surface BC-E connects the support surface BC-S and the bottom surface BC-B and is spaced apart from the sidewall surface BC-W to face the sidewall surface BC-W.

A vertical distance between the bottom surface BC-B and the support surface BC-S gradually increases as closer to a center portion of the support surface BC-S in the first direction DR1.

The bottom frame BF-1 includes a magnetic member MG disposed at at least one end of the support surface BC-S.

In the case that the bottom chassis BC is unitary with the support frame SF, the bottom frame BF-1 may prevent the support frame SF from moving in the bottom chassis BC compared to the case that the support frame SF and the bottom chassis BC are separated each other.

Referring to FIG. 12, the bottom frame BF-2 includes a bottom surface BC-B, a sidewall surface BC-W, a support surface BC-S, and an extension surface BC-E.

The bottom surface BC-B is substantially parallel to a plane defined by the first and second directions DR1 and DR2. The sidewall surface BC-W is bent and extends from the bottom surface BC-B.

The support surface BC-S is protruded from the bottom surface BC-B to the third direction DR3. The support surface BC-S is provided as a curved surface with respect to the first direction DR1. The extension surface BC-E connects the support surface BC-S and the bottom surface BC-B and is spaced apart from the sidewall surface BC-W to face the sidewall surface BC-W.

The bottom frame BF-2 includes a magnetic member MG disposed at at least one end of the support surface BC-S.

In the illustrated exemplary embodiment, the bottom surface BC-B, the sidewall surface BC-W, the support surface BC-S, and the extension surface BC-E have the same thickness. Accordingly, since the bottom frame BF-2 has the above-mentioned structure, the display device becomes slim.

FIGS. 13A to 13H are cross-sectional views showing a method of manufacturing a display device according to an exemplary embodiment of the invention. Hereinafter, the manufacturing method of the display device will be described in detail with reference to FIGS. 13A to 13H. For the convenience of explanation, in FIGS. 13A to 13H, the same reference numerals denote the same elements in FIGS. 1 to 12, and thus detailed descriptions of the same elements will be omitted.

The manufacturing method of the display device includes providing a bottom chassis having a flat bottom portion, providing a support frame including a lower surface that is flat, an upper surface curved with respect to the first direction, and a first magnetic member disposed on the upper surface on the bottom portion, providing a light guide plate that is flat and includes a second magnetic member disposed on a surface thereof facing the upper surface on the upper surface, fixing the light guide plate to the upper surface, providing a light source unit and an optical sheet, fixing the optical sheet, providing a display panel, and fixing the display panel.

Figure 13A:
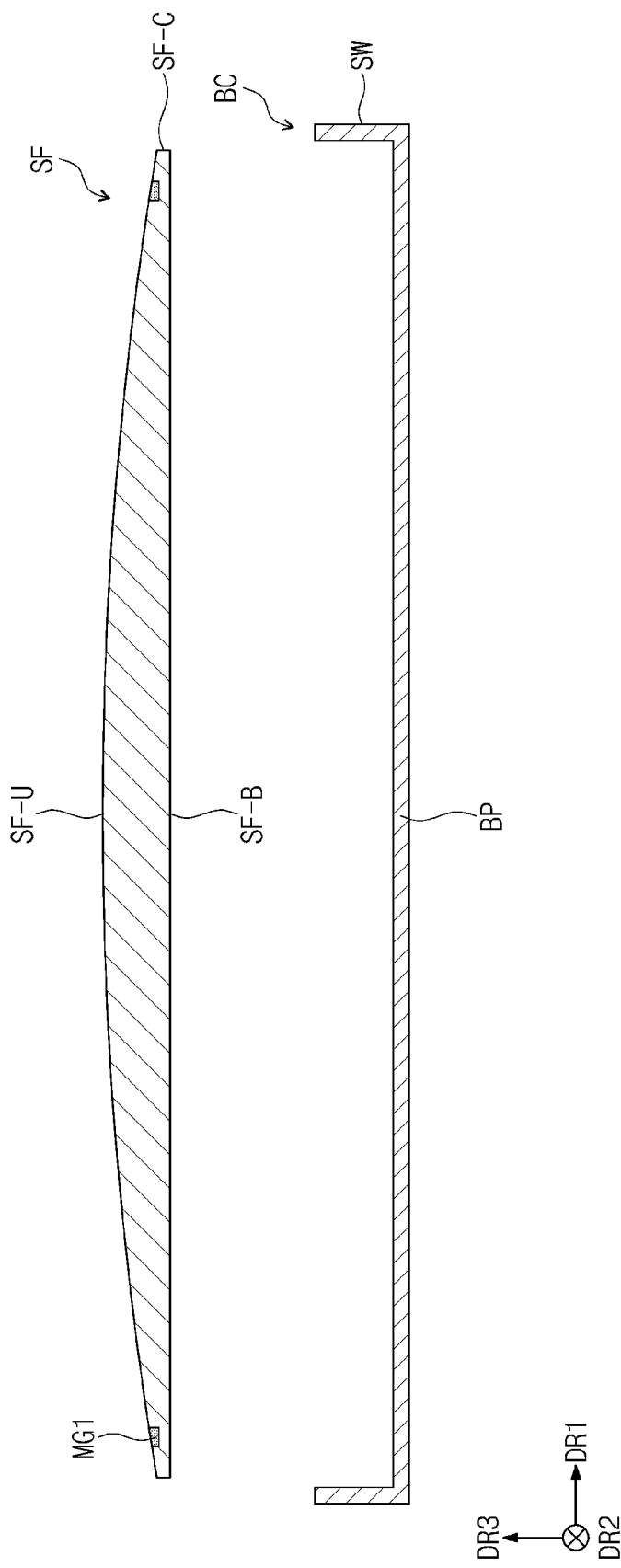
Figure 13B:
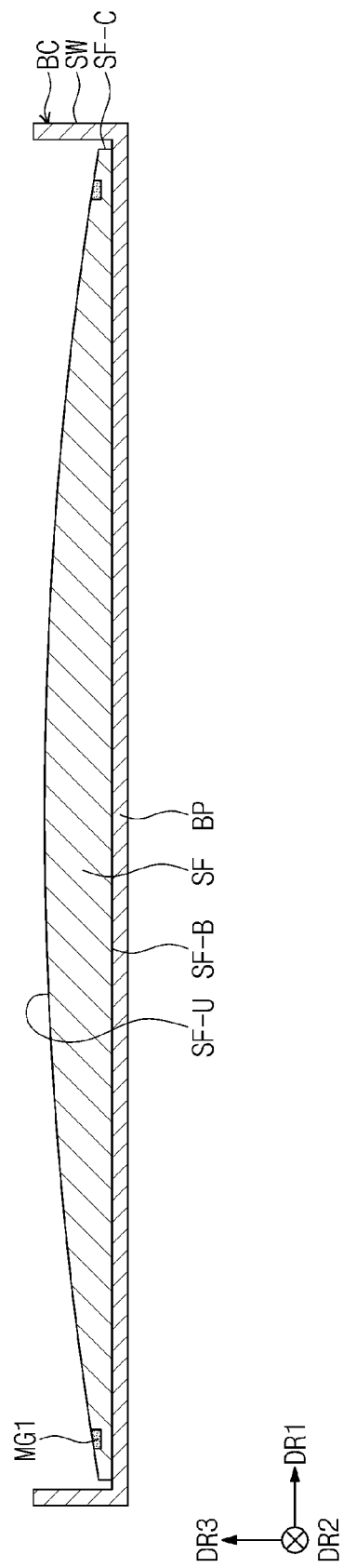

FIGS. 13A and 13B show the providing of the support frame.

Referring to FIGS. 13A and 13B, the support frame SF is provided on the bottom chassis BC and placed on the bottom portion BP of the bottom chassis BC. The lower surface SF-B of the support frame SF contacts the bottom portion BP, and the connection surface SF-C of the support frame SF is spaced apart from the sidewall portion SW by a predetermined distance and disposed to face the sidewall portion SW.

Figure 13D:
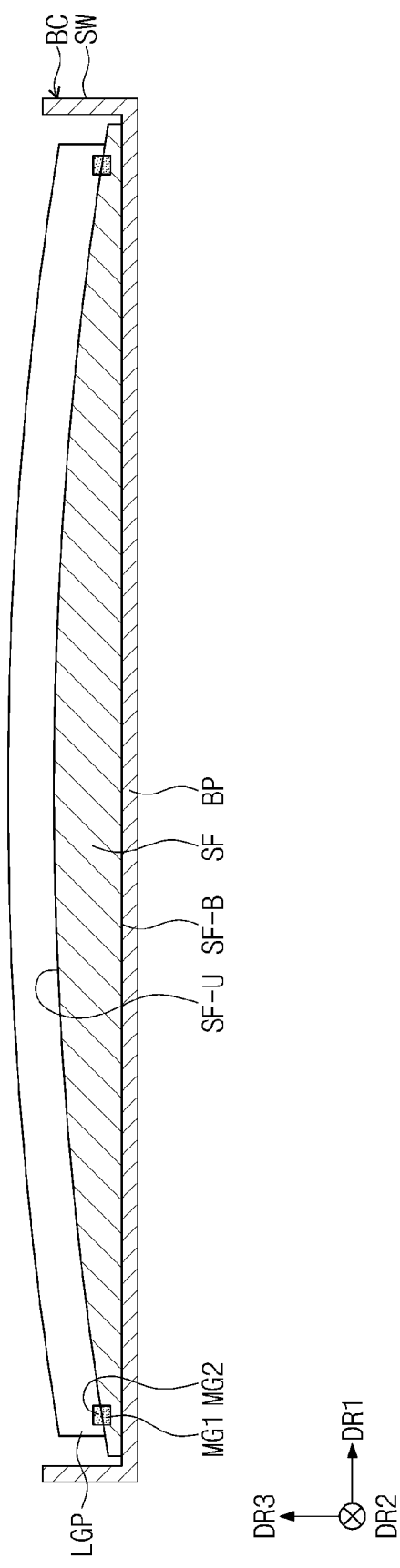

FIGS. 13C and 13D show the providing of the light guide plate and the fixing of the light guide plate, respectively.

Referring to FIGS. 13C and 13D, the light guide plate LGP is provided on the support frame SF. In this case, the second magnetic member MG2 is disposed to face the first magnetic member MG1. Then, the light guide plate LGP is placed on the upper surface SF-U of the support frame SF.

The light guide plate LGP in the flat state is curved to correspond to the curved shape of the upper surface SF-U of the support frame SF since the second magnetic member MG2 is attached to the first magnetic member MG1, and then the light guide plate LGP is fixed to the support frame SF. In addition, the light guide plate LGP is easily attached to or detached from the support frame SF.

Figure 13E:
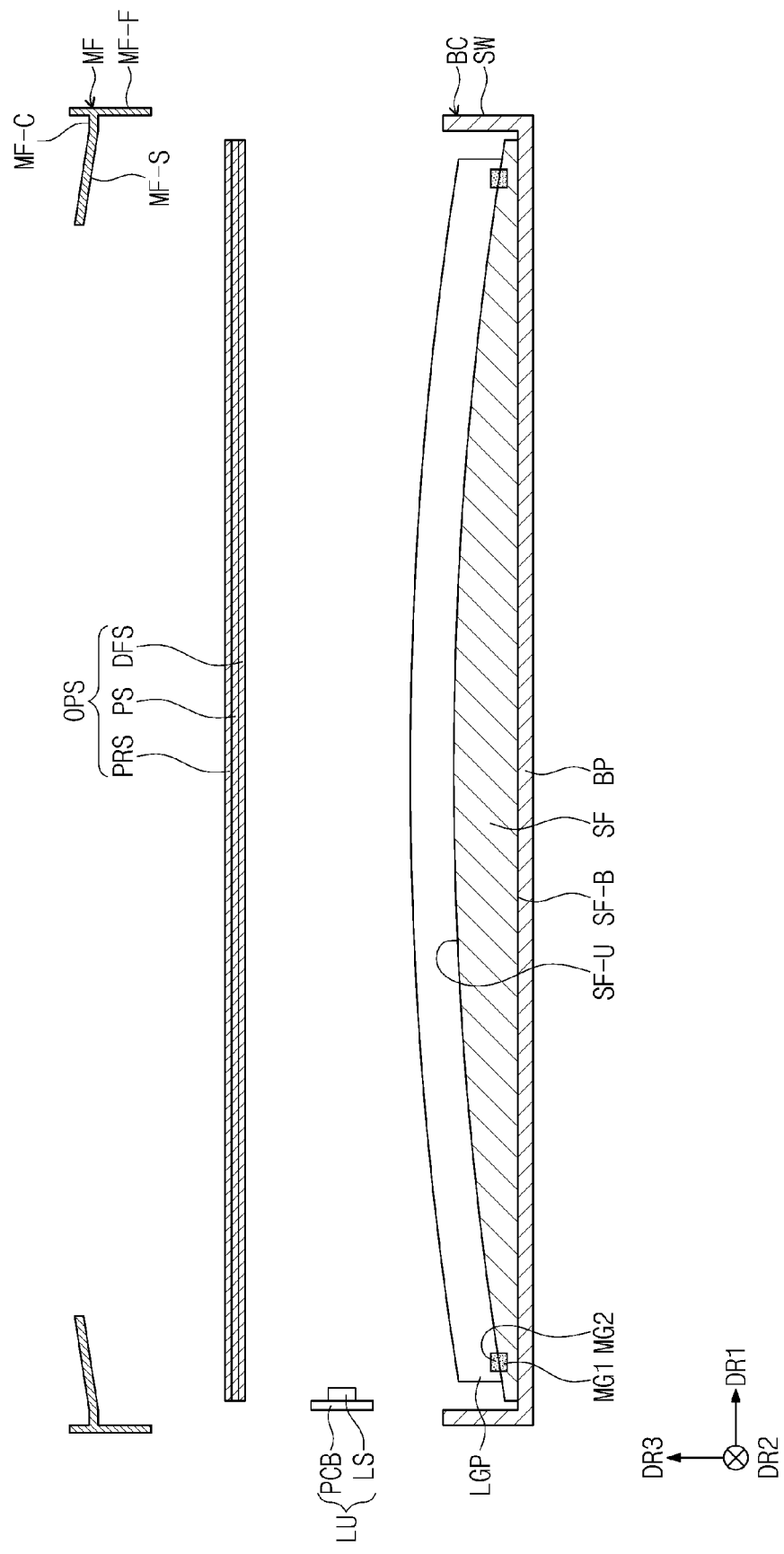
Figure 13F:
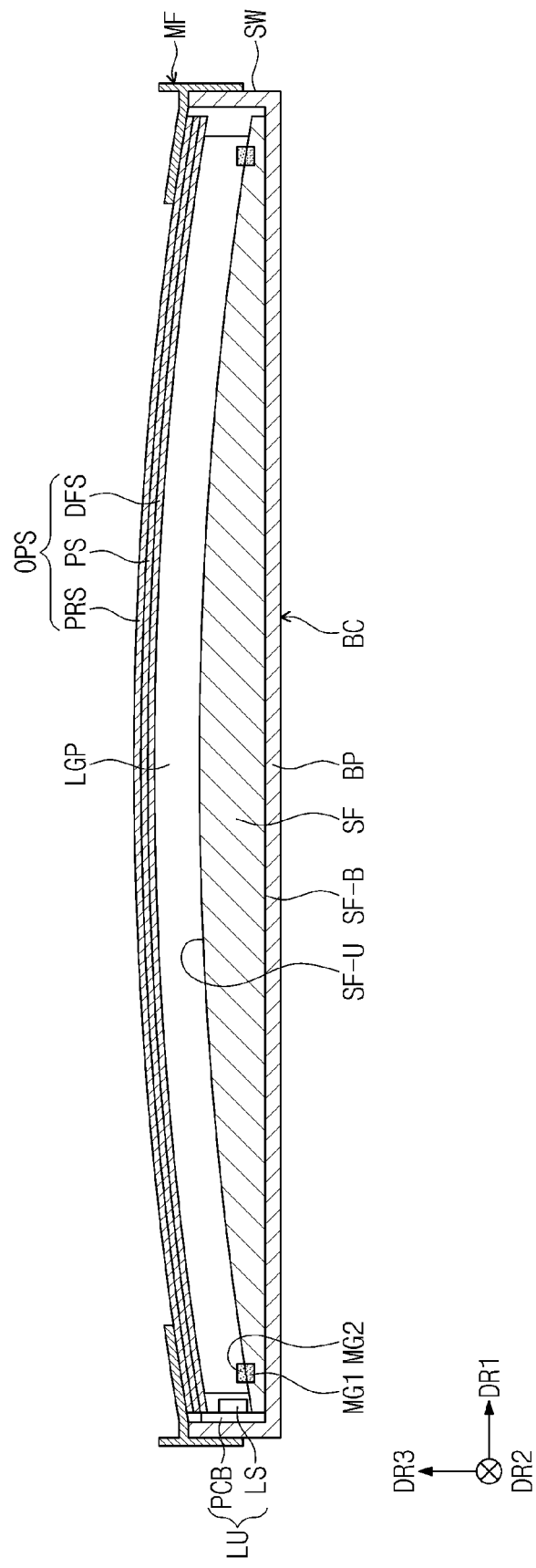

FIGS. 13E and 13F show the providing of the optical sheet and the fixing of the optical sheet, respectively.

Referring to FIGS. 13E and 13F, the light source unit LU is provided to one side portion of the light guide plate LGP, and the optical sheet OPS is provided on the light guide plate LGP. The optical sheet OPS is curved to correspond to the curved shape of the light guide plate LGP on the light guide plate LGP.

The mold frame MF is provided on the optical sheet OPS and the bottom chassis BC. The mold frame MF is assembled with the bottom chassis BC to hold the optical sheet OPS.

The support portion MF-S of the mold frame MF is disposed on the optical sheet OPS to maintain the curved shape of the optical sheet OPS.

Figure 13G:
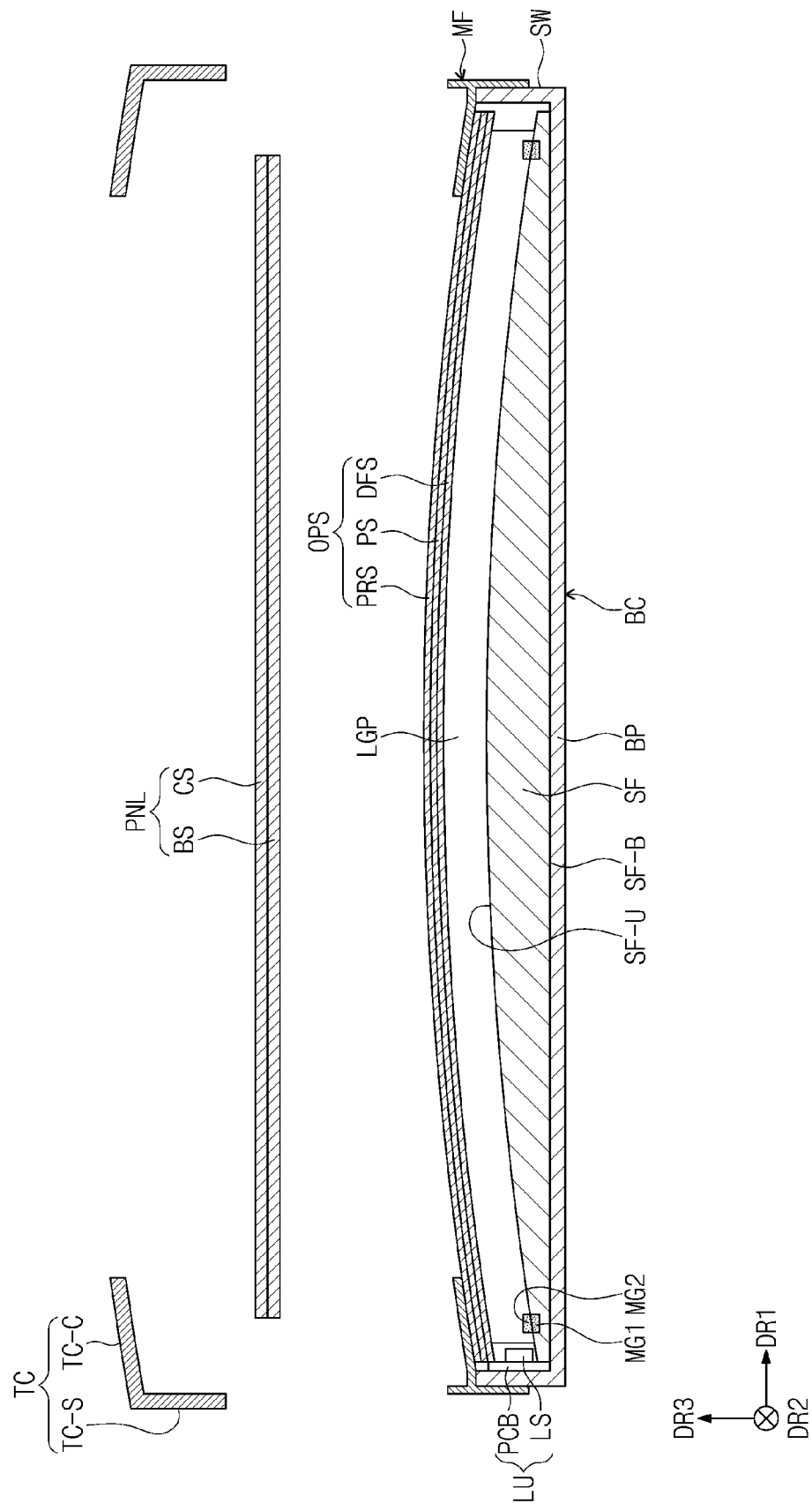
Figure 13H:
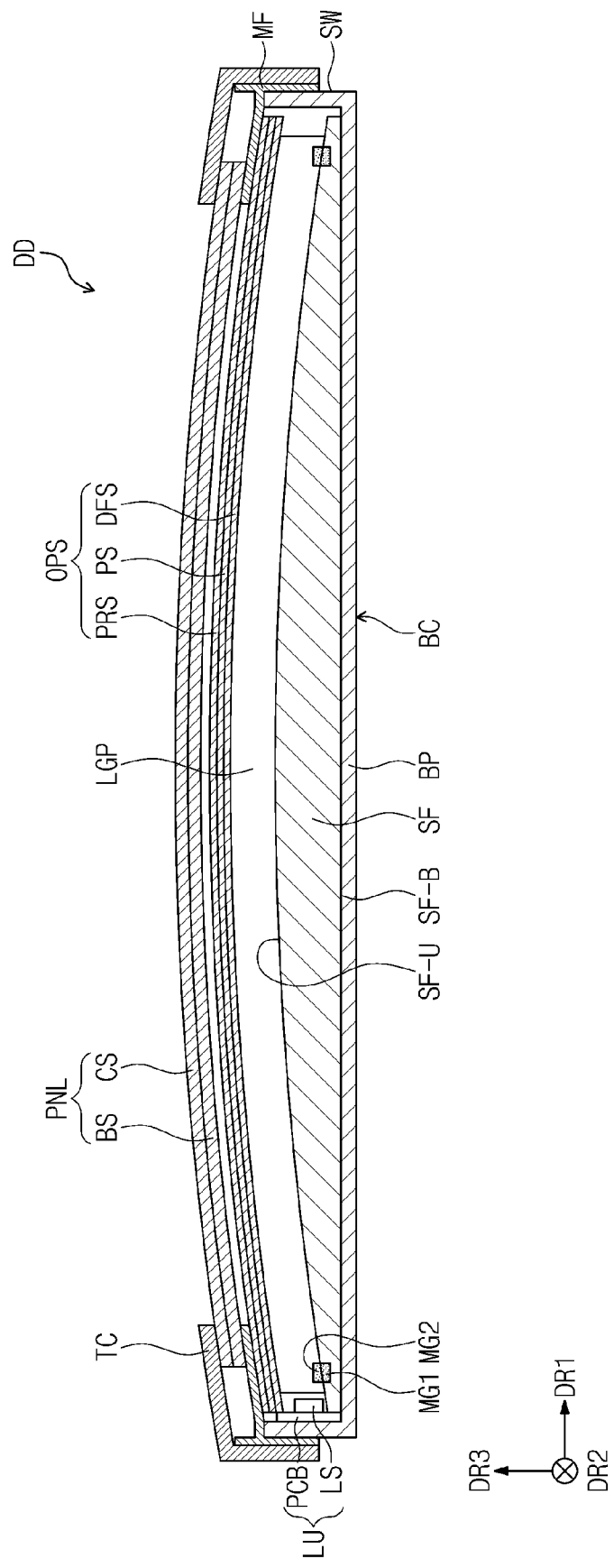

FIGS. 13G and 13H show the providing of the display panel and the fixing of the display panel.

Referring to FIGS. 13G and 13H, the display panel PNL is provided on the optical sheet OPS. The display panel PNL is disposed to face the optical sheet OPS such that the support portion MF-S of the mold frame MF is disposed between the display panel PNL and the optical sheet OPS. The edge of the display panel PNL is supported by the support portion MF-S.

The top chassis TC is provided on the display panel PNL. The top chassis TC is assembled to the mold frame MF to hold the display panel PNL. The display panel PNL is disposed between the support portion MF-S of the mold frame MF and the cover portion TC-C of the top chassis TC, and thus the display panel PNL is curved to correspond to the curved shape of the optical sheet OPS, the light guide plate LGP, and the upper surface SF-U of the support frame SF. The display panel PNL is held by the top chassis TC and the mold frame MF.

Although the exemplary embodiments of the invention have been described, it is understood that the invention should not be limited to these exemplary embodiments but various changes and modifications can be made by one ordinary skilled in the art within the spirit and scope of the invention as hereinafter claimed.

What is claimed is:

1. A display device comprising:
   a display panel which displays an image and curved with respect to a first direction;
   a light source unit which provides a light to the display panel;
   a light guide plate curved with respect to the first direction and comprising a light incident surface facing the light source unit, a light output surface facing the display panel, and an opposite surface facing the light output surface;
   a bottom chassis disposed under the light guide plate;
   a support frame disposed between the light guide plate and the bottom chassis and comprising an upper surface curved with respect to the first direction and a lower surface which is flat;
   a first magnetic member disposed at at least one edge of the upper surface of the support frame; and
   a second magnetic member disposed at at least one edge of the opposite surface of the light guide plate and facing the first magnetic member,
   wherein
   a groove is defined in at least one of the upper surface of the support frame and the opposite surface of the light guide plate such that at least one of the first magnetic member and the second magnetic member is disposed in the groove.

2. The display device of claim 1, wherein each of the display panel, the light guide plate, and the upper surface is convexly curved on a plane defined by the first direction and a second direction crossing the first direction with respect to a reference axis substantially parallel to the second direction.

3. The display device of claim 2, wherein the bottom chassis comprises:

a bottom portion substantially parallel to the plane defined by the first and second directions and facing the lower surface of the support frame; and a sidewall portion bent and extending from the bottom portion.

4. The display device of claim 3, wherein the first magnetic member is placed in a first groove of the groove defined in the upper surface of the support frame.

5. The display device of claim 4, wherein the second magnetic member is placed in a second groove of the groove defined in the opposite surface of the light guide plate.

6. The display device of claim 3, wherein the first magnetic member is provided in a plural number, and the first magnetic members are arranged in one line and spaced apart from each other at regular intervals.

7. The display device of claim 6, wherein the second magnetic member is provided in a plural number, the second magnetic members are arranged in one line and spaced apart from each other at regular intervals, and each of the second magnetic members faces a corresponding first magnetic member of the first magnetic members.

8. The display device of claim 3, wherein the light source unit comprises:
a printed circuit board extending in the second direction; and
light sources arranged on the printed circuit board along the second direction and spaced apart from each other at regular intervals.

9. The display device of claim 8, wherein the second magnetic member corresponds to a space between the light sources adjacent to each other among the light sources in the first direction.

10. The display device of claim 3, wherein the first magnetic member comprises a first sub-magnetic member and a second sub-magnetic member, which are respectively disposed at two edges facing each other of the upper surface of the support frame, and
wherein the second magnetic member comprises a third sub-magnetic member and a fourth sub-magnetic member, which are respectively disposed at two edges facing each other of the opposite surface of the light guide plate, and the third and fourth sub-magnetic members respectively overlap the first and second sub-magnetic members.

11. The display device of claim 3, further comprising a top chassis disposed on the display panel, wherein the top chassis comprises:
a cover portion covering a front edge of the display panel; and
a side surface portion bent and extending from the cover portion and facing the sidewall portion of the bottom chassis.

12. The display device of claim 11, further comprising a mold frame disposed between the bottom chassis and the display panel, wherein the mold frame comprises:
a support portion disposed between the display panel and the light guide plate and having a curved shape;
a fixing portion disposed between the sidewall portion of the bottom chassis and the side surface portion of the top chassis; and
a connection portion disposed on the sidewall portion of the bottom chassis and connecting the support portion and the fixing portion.

13. A backlight unit comprising:
a bottom chassis comprising a bottom portion substantially parallel to a plane defined by a first direction and a second direction crossing the first direction and a sidewall portion bent and extending from the bottom portion;
a support frame disposed on the bottom portion and comprising a lower surface substantially parallel to the bottom portion and an upper surface curved with respect to a reference axis substantially parallel to the second direction on the bottom portion;
a light guide plate which is disposed on the support frame and curved corresponding to a curved shape of the upper surface;
a light source unit disposed between the light guide plate and the sidewall portion;
a first magnetic member disposed at at least one edge of the upper surface of the support frame; and
a second magnetic member disposed at at least one edge of a surface of the light guide plate, which faces the upper surface, and facing the first magnetic member, wherein
a groove is defined in at least one of the upper surface of the support frame and the surface of the light guide plate such that at least one of the first magnetic member and the second magnetic member is disposed in the groove.

14. The backlight unit of claim 13, wherein the upper surface has a substantially same radius of curvature as a radius of curvature of the light guide plate when in a cross-sectional view substantially parallel to a plane defined by the first direction and a third direction substantially vertical to the first and second directions.

15. The backlight unit of claim 14, wherein the first magnetic member extends along a direction in which the at least one edge of the upper surface of the support frame extends.

16. The backlight unit of claim 14, wherein the first magnetic member is provided in a plural number, and the first magnetic members are arranged in one line and spaced apart from each other at regular intervals.

17. A method of manufacturing a display device, the method comprising:
providing a bottom chassis comprising a flat bottom portion;
providing a support frame on the bottom portion, the support frame comprising a lower surface which is flat, an upper surface curved with respect to a first direction, and a first magnetic member disposed on the upper surface;
providing a light guide plate on the upper surface, the light guide plate being flat and comprising a second magnetic member disposed on a surface of the light guide plate facing the upper surface;
fixing the light guide plate to the upper surface;
providing a light source unit to a position adjacent to one side portion of the light guide plate; and
providing a display panel on the light guide plate,
wherein
a groove is defined in at least one of the upper surface of the support frame and the surface of the light guide plate such that at least one of the first magnetic member and the second magnetic member is disposed in the groove.

18. The method of claim 17, wherein the fixing the light guide plate is performed by overlapping the first magnetic member with the second magnetic member to allow the flat light guide plate to be curved corresponding to a shape of the upper surface.

19. The method of claim 18, further comprising:
providing a mold frame on the light guide plate and the bottom chassis; and
providing a top chassis on the display panel.

20. The method of claim 19, wherein the display panel is disposed between the top chassis and the mold frame and curved with respect to the first direction to correspond to a curved shape of the light guide plate.

21. A display device comprising:
a display panel which displays an image and curved with respect to a first direction;
a light source unit which provides a light to the display panel;
a light guide plate curved with respect to the first direction and comprising a light incident surface facing the light source unit, a light output surface facing the display panel, and an opposite surface facing the light output surface;
a bottom chassis disposed under the light guide plate;
a support frame disposed between the light guide plate and the bottom chassis and comprising an upper surface curved with respect to the first direction and a lower surface which is flat;
a first magnetic member disposed at at least one edge of the upper surface of the support frame; and
a second magnetic member disposed at at least one edge of the opposite surface of the light guide plate and facing the first magnetic member,
wherein the first magnetic member is placed in a first groove of the groove defined in the upper surface of the support frame.

* * * * *